(12) United States Patent  
Kobayashi et al.

(10) Patent No.: US 9,280,440 B2  
(45) Date of Patent: Mar. 8, 2016

(54) MONITORING TARGET APPARATUS, AGENT PROGRAM, AND MONITORING SYSTEM

(71) Applicant: Hitachi, Ltd., Tokyo (JP)

(72) Inventors: Kensuke Kobayashi, Tokyo (JP); Shigeru Horikawa, Tokyo (JP); Kaichirou Ozeki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 100 days.

(21) Appl. No.: 14/239,964

(22) PCT Filed: Mar. 18, 2013

(86) PCT No.: PCT/JP2013/057596  
§ 371 (c)(1),  
(2) Date: Feb. 20, 2014

(87) PCT Pub. No.: WO2014/147692  
PCT Pub. Date: Sep. 25, 2014

(65) Prior Publication Data  
US 2015/0254159 A1  Sep. 10, 2015

(51) Int. Cl.  
*G08C 25/02* (2006.01)  
*H04L 1/18* (2006.01)  
*G06F 11/34* (2006.01)  
*G06F 13/00* (2006.01)  
*H04L 12/26* (2006.01)

(52) U.S. Cl.  
CPC ............ *G06F 11/3495* (2013.01); *G06F 13/00* (2013.01); *H04L 43/0847* (2013.01)

(58) Field of Classification Search  
CPC ...... G06F 11/3089; H04M 3/523; H04M 3/48  
See application file for complete search history.

(56) References Cited

U.S. PATENT DOCUMENTS

| | | | |
|---|---|---|---|
| 6,618,805 B1* | 9/2003 | Kampe | 713/1 |
| 2003/0009530 A1* | 1/2003 | Philonenko et al. | 709/206 |
| 2003/0235288 A1* | 12/2003 | McCormack | 379/265.02 |
| 2009/0313198 A1 | 12/2009 | Kudo et al. | |
| 2010/0131467 A1* | 5/2010 | Prahlad et al. | 707/617 |
| 2010/0228819 A1* | 9/2010 | Wei | 709/203 |
| 2011/0137973 A1* | 6/2011 | Wei et al. | 709/202 |
| 2011/0142053 A1* | 6/2011 | Van Der Merwe et al. | 370/395.1 |
| 2011/0208822 A1* | 8/2011 | Rathod | 709/206 |
| 2013/0042243 A1* | 2/2013 | Yoshida | 718/100 |

FOREIGN PATENT DOCUMENTS

| | | |
|---|---|---|
| JP | 2004-005170 A | 1/2004 |
| JP | 2008-040750 A | 2/2008 |
| JP | 2011-518359 A | 6/2011 |

* cited by examiner

*Primary Examiner* — Guy Lamarre  
(74) *Attorney, Agent, or Firm* — Volpe and Koenig, P.C.

(57) ABSTRACT

A monitoring target apparatus connected to a plurality of monitoring manager apparatuses is characterized in that the monitoring target apparatus includes, in a memory, a monitoring agent for collecting monitoring information from monitoring target resources among resources constituting the monitoring target apparatus; and monitoring condition management information that defines an event issuance condition for each type of the monitoring target resources; wherein the monitoring agent judges whether to issue an event or not, based on the monitoring information and the monitoring condition management information; and if the monitoring agent issues the event, it transmits the issued event to all the plurality of monitoring manager apparatuses.

11 Claims, 25 Drawing Sheets

FIG. 5

| Connection Destination Manager Host | Connection Priority |
|---|---|
| hostα | 1(Primary) |
| hostβ | 2(Secondary) |

| Monitored Target | Whether Stored in DB or Not | Interval (sec) | Offset (sec) |
|---|---|---|---|
| CPU | Y | 60 | 0 |
| Memory | N | 60 | 20 |
| Process | Y | 300 | 0 |
| Response | N | 120 | 40 |
| : | : | : | : |

| Condition Definition Name | Abnormal Condition | Warning Condition | Monitoring Time Zone | Message |
|---|---|---|---|---|
| CPU Monitoring | CPU>90 | 90≧CPU>50 | Always | CPU activity ratio of <host name> is <monitored value> % |
| Memory Monitoring | Memory > 85 | 85≧Memory > 60 | 10:00-23:00 | Memory activity ratio of <host name> is <monitored value> % |
| Process Monitoring | Process = Stop | Process = Stop | 09:00-24:00 | <Monitored target> of <host name> has stopped |
| Response Monitoring | Response > 100 Ms | 100 ms≧Response > 50ms | Always | Response to <host name> is <monitored value> ms |
| ... | ... | ... | ... | ... |

10311, 10312, 10313, 10314, 10315

1031

| Condition Definition Name | Monitored Target Host Name | Status | Monitoring Information | Action Flag | Date/Time |
|---|---|---|---|---|---|
| CPU Monitoring | hostA | Abnormal | 95 | 1 | 2012/11/01 12:00:00 |
| E11 | E12 | E13 | E14 | E15 | E16 |

FIG. 10

| Condition Definition Name | Monitored Target Type | Abnormal Condition | Warning Condition | Monitoring Time Zone | Message |
|---|---|---|---|---|---|
| CPU Monitoring | Platform | Activity Ratio > 90 | 90 ≧ CPU > 50 | Always | CPU activity ratio of <host name> is <monitored value> % |
| Memory Monitoring | Platform | Activity Ratio > 85 | 85 ≧ Memory > 60 | 10:00-23:00 | Memory activity ratio of <host name> is <monitored value> % |
| Process Monitoring | Platform | Process has stopped | Process has stopped | 09:00-24:00 | <Monitored target> of <host name> has stopped |
| Response Monitoring | Network | Time > 100 ms | 100 ms ≧ Response > 50 ms | Always | Response to <host name> is <monitored value> ms |
| ... | ... | ... | ... | ... | ... |

FIG. 11

| Condition Definition Name | Distribution Target Host |
|---|---|
| CPU Monitoring | hostA |
| CPU Monitoring | hostB |
| Memory Monitoring | hostB |
| Process Monitoring | hostA |
| Process Monitoring | hostC |
| : | : |

| Condition Definition Name | Action Condition | Mail | Command | SNMP | Action Execution Location |
|---|---|---|---|---|---|
| CPU Monitoring | Abnormal | 1 | <N/A> | 0 | hostα |
| Memory Monitoring | Abnormal | 1 | stopservice.sh | 0 | hostα |
| Memory Monitoring | Warning | 1 | <N/A> | 0 | hostα |
| Process Monitoring | Abnormal | 0 | ps-ef > ps.txt | 0 | hostα |
| Process Monitoring | Warning | 0 | ps-ef > ps.txt | 0 | hostα |
| Response Monitoring | Abnormal | 1 | <N/A> | 1 | hostα |

| Condition Definition Name | Monitored Target Host Name | Status | Monitoring Information | Action Flag | Whether Transmitted to Primary Apparatus or Not | Whether Transmitted to Secondary Apparatus or Not | Date/Time |
|---|---|---|---|---|---|---|---|
| CPU Monitoring | hostA | Abnormal | 95 | 0 | Y | N | 2012/11/01 12:00:00 |
| E11A | E12A | E13A | E14A | E15A | E17A | E18A | E16A |

| Whether Transmitted to Primary Apparatus or Not | Whether Transmitted to Secondary Apparatus or Not | Action Flag upon Transmission to Primary Apparatus | Action Flag upon Transmission to Secondary Apparatus |
|---|---|---|---|
| Y | Y | - (Not stored in queue) | - (Not stored in queue) |
| Y | N | - (Transmitted) | 0 |
| N | Y | 0 | - (Transmitted) |
| N | N | 1 | 1 |
| 10351 | 10352 | 10353 | 10354 |

MONITORING TARGET APPARATUS, AGENT PROGRAM, AND MONITORING SYSTEM

TECHNICAL FIELD

The present invention relates to a monitoring target apparatus, an agent program, and a monitoring system.

BACKGROUND ART

Conventionally, a system comprising a server system, a storage apparatus, and a network device uses management software for continuously and stably operating the system. This management software is software intended to centrally manage performance information about, and the operating status of, each of the server system, the storage apparatus, and the network device which constitute the system. The management software is disclosed in, for example, Patent Literature 1.

Patent Literature 1 discloses a monitoring system including monitoring target apparatuses, such as a server system, a storage apparatus, and a network device, and a monitoring computer for monitoring performance information about these monitoring target apparatuses and their operating status. Each monitoring target apparatus stores a monitoring agent and this monitoring agent is intended to have the monitoring computer centrally manage each monitoring target apparatus by collecting the performance information and the operating status of resources (processors and memories) of the monitoring target apparatuses and aggregating the collected information in the monitoring computer.

CITATION LIST

Patent Literature

[Patent Literature 1] Japanese Unexamined Patent Application Publication (Translation of PCT Application) No. 2011-518359

SUMMARY OF INVENTION

Problems to be Solved by the Invention

However, if the operation of the monitoring computer for the system described in this Patent Literature 1 temporarily stops due to a disaster or the monitoring computer can no longer acquire information from the monitoring target apparatuses due to some fault, the system has a problem of loss of control over targets to be monitored by means of, for example, monitoring and actions until recovery (hereinafter referred to as monitoring control). Particularly, for example, if a bank system that needs to be monitored for 24 hours for 365 days is a monitoring target apparatus and its monitoring control stops, this will cause a serious problem.

The present invention was devised in consideration of the above-described circumstances and suggests a monitoring target apparatus, agent program, and monitoring system capable of continuously and stably operating monitoring control.

Means for Solving the Problems

In order to solve the above-described problems, the present invention is characterized in that a monitoring target apparatus includes, in a memory, a monitoring agent for collecting monitoring information from monitoring target resources among resources constituting the monitoring target apparatus; and monitoring condition management information that defines an event issuance condition for each type of the monitoring target resources; wherein the monitoring agent judges whether to issue an event or not, based on the monitoring information and the monitoring condition management information; and if the monitoring agent issues the event, it transmits the issued event to all the plurality of monitoring manager apparatuses.

Furthermore, in order to solve the above-described problems, the present invention is characterized in that an agent program implements: a function that allows a computer of a monitoring target apparatus connected to a plurality of monitoring manager apparatuses to include, in a memory, a monitoring agent for collecting monitoring information from monitoring target resources among resources constituting the monitoring target apparatus; and a function that includes, in the memory, monitoring condition management information defining an event issuance condition for each type of the monitoring target resources; and a function that judges whether to issue an event or not, based on the monitoring information and the monitoring condition management information and transmits the issued event to all the plurality of monitoring manager apparatuses when issuing the event.

Furthermore, in order to solve the above-described problems, the present invention is characterized in that a monitoring system comprises a monitoring target apparatus and a plurality of monitoring manager apparatuses connected to the monitoring target apparatus; wherein the monitoring target apparatus includes, in a memory, a monitoring agent for collecting monitoring information from monitoring target resources among resources constituting the monitoring target apparatus; and monitoring condition management information that defines an event issuance condition for each type of the monitoring target resources; wherein the monitoring agent judges whether to issue an event or not, based on the monitoring information and the monitoring condition management information; and if the monitoring agent issues the event, it transmits the issued event to all the plurality of monitoring manager apparatuses; and wherein the monitoring manager apparatuses receives the event from the monitoring agent.

Advantageous Effects of Invention

Monitoring control can be operated continuously and stably according to the present invention.

BRIEF DESCRIPTION OF DRAWINGS

FIG. 5 is a logical configuration diagram of a connection destination monitoring manager management table.

FIG. 6 is a logical configuration diagram of a monitoring information collection definition management table.

FIG. 7 is a logical configuration diagram of a monitoring condition management table.

FIG. 10 is a logical configuration diagram of a monitoring condition definition management database.

FIG. 11 is a logical configuration diagram of a monitoring condition distribution destination management database.

FIG. 12 is a logical configuration diagram of an action definition management database.

FIG. 25 is a logical configuration diagram of an event according to the second embodiment.

FIG. 26 is a conceptual diagram showing correspondence relationship information.

DESCRIPTION OF EMBODIMENTS

An embodiment of the present invention will be described below in detail with reference to drawings.

Information about this invention will be explained in the description below, using expressions such as "aaa tables," "aaa lists," "aaa DBs," and "aaa queues," but these pieces of information may not be expressed by means of data structures such as tables, lists, DBs, and queues. Accordingly, information such as "aaa tables," "aaa lists," "aaa DBs," and "aaa queues," may be sometimes called "aaa information" in order to indicate that such information does not depend on the data structures. Moreover, expressions such as "identification information," "identifier," "name," and "ID" are used when explaining the content of each piece of information, but they can be replaced with each other.

The following explanation may be given by using the word "program" as a subject. However, since a program is executed by execution of specified processing by a processor using a memory and a communication port (communication control device), the processor may be used as a subject in the explanation. Also, the processing disclosed by using a program as a subject may be processing executed by a computer such as a management computer or an information processing unit. Moreover, part or all programs may be implemented by dedicated hardware. Furthermore, an embodiment will be explained as a program that operates in a single thread; however, the embodiment may be implemented by program hardware that operates in a multi-thread and multi-process.

Various programs may be installed in each computer by means of storage media which can be read by a program distribution server and the computer. In this case, the program distribution server includes a CPU (Central Processing Unit) and storage resources and the storage resources further store distribution programs and target programs to be distributed. Then, as the CPU executes the distribution programs, the CPU for the program distribution server distributes the target programs to be distributed to other computers.

(1) First Embodiment

(1-1) Outline of this Embodiment

Figure 1:
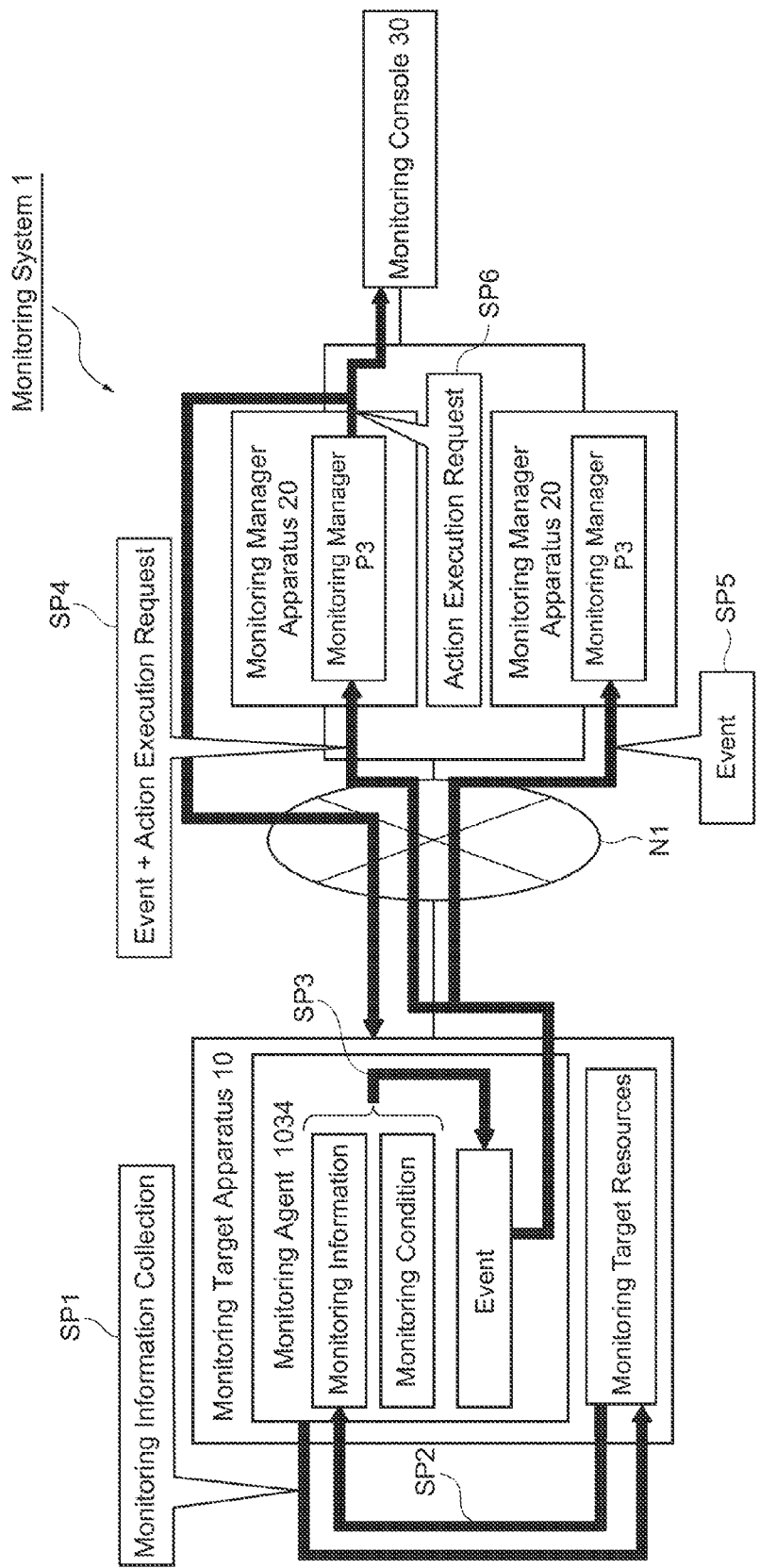
FIG. 1 is a schematic diagram for explaining the outline of monitoring control according to this embodiment.

FIG. 1 is a schematic diagram for explaining the outline of monitoring control according to this embodiment. As a double active configuration is adopted for monitoring manager apparatuses 20 of a monitoring system 1 and even if some anomaly occurs at either one of the monitoring manager apparatuses 20 and the operation of that monitoring manager apparatus 20 stops, this embodiment is designed to prevent monitoring control of the monitoring system 1 from stopping by executing an action to make the other monitoring manager apparatus 20 assist or improve the operation of the monitoring system 1. Furthermore, if the monitoring manager apparatuses 20 simply have the double active configuration, the plurality of monitoring manager apparatuses 20 may execute the same action. So, this embodiment is intended to prevent the execution of the same action (fault execution of the action) by each of the monitoring manager apparatuses 20.

Specifically speaking, a monitoring target apparatus 10, the monitoring manager apparatuses 20 having the double active configuration, and a monitoring console 30 which constitute the monitoring system 1 execute the following processing. Firstly, the monitoring target apparatus 10 is configured by storing a monitoring agent 1034 and this monitoring agent 1034 periodically collects monitoring information from monitoring target resources (SP1).

The collected monitoring information is information indicating performance information and operating information about resources such as a CPU activity ratio, a memory activity ratio, process operation status, and response performance.

Next, after collecting the monitoring information from the resources (SP2), the monitoring agent 1034 judges whether to generate an event or not, based on the collected monitoring information and a predetermined monitoring condition. The event is: information generated when the collected monitoring information satisfies the predetermined monitoring condition; and information indicating that the monitoring target apparatus 10 is in an abnormal state or a warning state. The monitoring condition is threshold information indicating whether the abnormal state or the warning state.

When the monitoring agent 1034 generates an event (SP3), it issues this event to each monitoring manager apparatus 20 of the double active configuration (SP4 and SP5). As all the monitoring manager apparatus 20 of the double active configuration receive the event, even if one of the monitoring manager apparatuses 20 stops due to some anomaly, it is possible to continue executing monitoring control based on the event received by the other monitoring manager apparatus 20.

When issuing the event, the monitoring agent 1034 issues an action execution request together with the event to either one of the monitoring manager apparatuses 20 (SP4) and issues only the event to the other monitoring manager apparatus 20 (SP5). Since the monitoring agent 1034 controls a receiver of the action execution request in this way, it is possible to have only the monitoring manager apparatus 20, which has received the action execution request, execute an action and prevent the monitoring manager apparatus 20, which has not received the action execution request, from executing the action. Therefore, it is possible to avoid fault execution of the action.

Incidentally, the event and the action execution request are illustrated here in the drawing by distinguishing one from the other for the purpose of illustration; however, the invention is not limited to this example and the event may include the action execution request or an action stop request to not allow execution of the action. Specifically speaking, the action execution request may be included in the event by providing an action flag in the event, setting the action flag to 1, and sending the event as will be described later in this embodiment. Moreover, the event can be included in the action stop request by setting the action flag to 0 and then sending the event.

The monitoring manager apparatus 20 which has received the action execution request issues an action execution request to the monitoring target apparatus 10 or the monitoring console 30 (SP6) and then terminates monitoring control according to this embodiment. Incidentally, when the monitoring target apparatus 10 receives the action execution request, it actually executes an action to, for example, stop the operation of a resource which is an action execution target. Moreover, when the monitoring console 30 receives the action execution request, it executes an action to notify an administrator of improvement of the monitoring target apparatus 10 by, for example, displaying that the monitoring target apparatus 10 is in the abnormal state or the warning state, on a display screen which is not shown here.

Accordingly, when the monitoring manager apparatuses 20 have the double active configuration and the monitoring agent 1034 generates an event, the event is issued to all the monitoring manager apparatuses 20 according to this embodiment. So, even if either one of the monitoring manager apparatuses 20 stops, it is possible to have the other monitoring manager apparatus 20 which has received the event issued from the monitoring agent 1034 continue monitoring control. Therefore, it is possible to avoid stoppage of monitoring control.

Furthermore, according to this embodiment, the monitoring agent 1034 controls a receiver of an action execution request and thereby issues the action execution request to only one of the monitoring manager apparatuses 20. So, it is possible to prevent fault execution of the action which can happen when the double active configuration of the monitoring manager apparatuses 20 is simply employed.

Therefore, according to this embodiment, it is possible to avoid monitoring control from stopping and prevent fault execution of the action, so that monitoring control can be operated continuously stably. Moreover, adjustment of the action execution is realized not by cooperation between the monitoring manager apparatuses 20, but by adjustment by the monitoring agent 1034, so that it is no longer necessary to construct a new communication path between the monitoring manager apparatuses 20. Furthermore, adjustment of the action execution by the monitoring agent 1034 makes it possible for only one of the monitoring manager apparatuses 20 to reliably execute the action even if a failure occurs at the monitoring manager apparatus 20 or a communication path connected to the monitoring manager apparatus 20 at any timing.

The details of a storage system and a storage system migration method according to this embodiment will be explained below with reference to drawings.

(1-2) Overall Configuration

Figure 2:
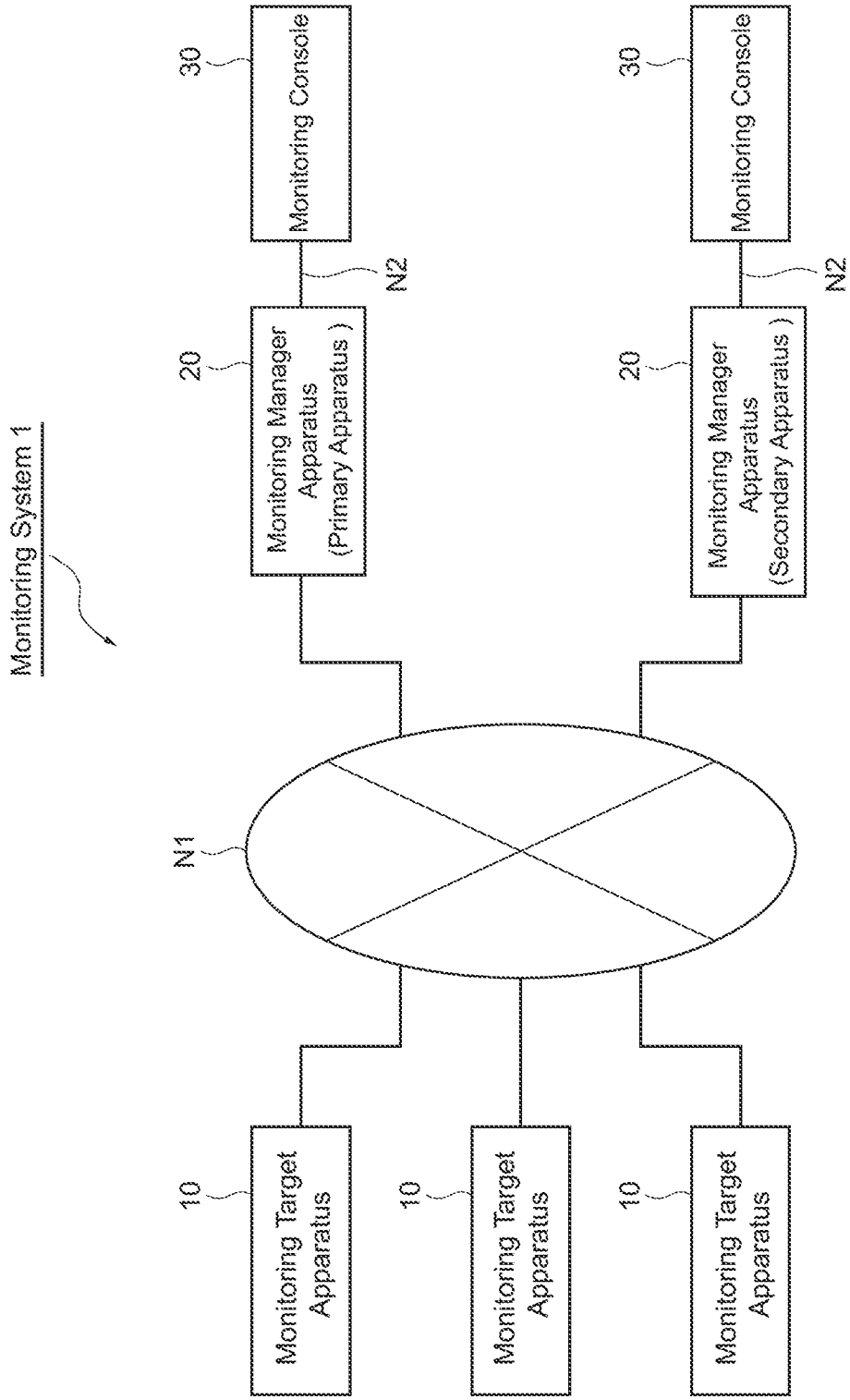
FIG. 2 is an overall configuration diagram of a monitoring system according to this embodiment.

FIG. 2 shows on overall configuration of the monitoring system 1. The monitoring system 1 includes a plurality of monitoring target apparatuses 10, monitoring manager apparatuses 20 of the double active configuration, and monitoring consoles 30. Each of the plurality of monitoring target apparatuses 10 and each of the monitoring manager apparatuses 20 having the double active configuration are mutually connected via communication path N1 so that they can communicate with each other. The communication path N1 is, for example, a LAN (Local Area Network). Moreover, the monitoring manager apparatus 20 and the monitoring console 30 are connected via communication path N2 so that they can communicate with each other; and this communication path N2 is a LAN like N1.

Incidentally, the configuration in which two monitoring manager apparatuses 20 are connected to the plurality of monitoring target apparatuses 10 via the same communication path N1; however, the same communication path does not necessarily have to be used and the monitoring manager apparatuses 20 may be connected to the plurality of monitoring target apparatuses 10 via different communication paths. Furthermore, the storage system has been described as being configured by locating the monitoring console 30; however, the monitoring console 30 is not always required and the monitoring manager apparatus 20 may have a display function of the monitoring console 30.

Next, the internal configuration of each apparatus will be explained with reference to FIG. 3 and FIG. 4.

(1-3) Internal Configuration

Figure 3:
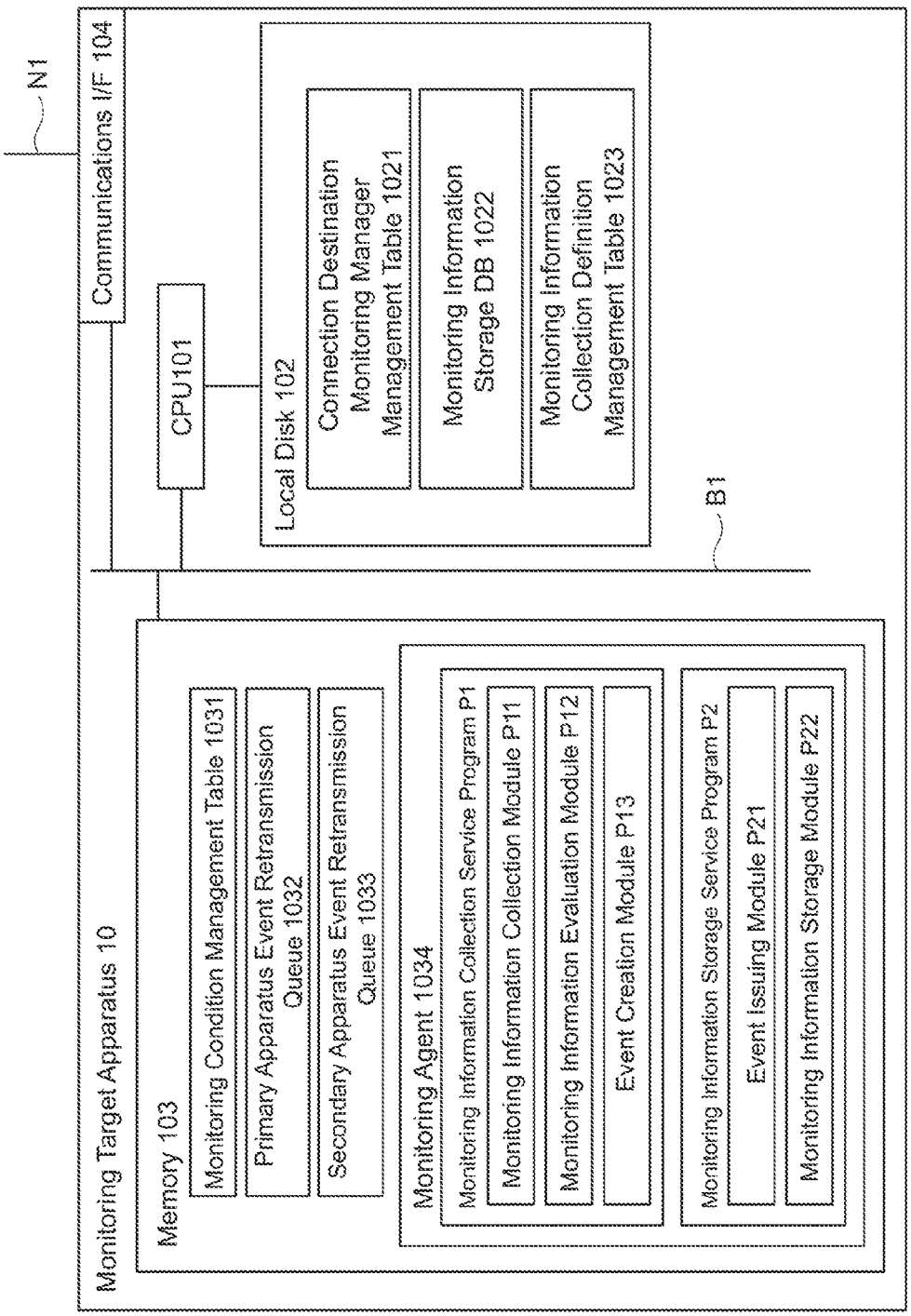
FIG. 3 is an internal configuration diagram of a monitoring target apparatus.

FIG. 3 shows the internal configuration of the monitoring target apparatus 10. The monitoring target apparatus 10 includes a CPU 101 for generally controlling the operation of the monitoring target apparatus 10, a local disk 102, a memory 103, and a communications I/F 104 for connecting to the communication path N1. Moreover, they are connected to each other via an internal bus B1 so that they can communicate with each other. Specifically speaking, it should be noted that the monitoring target apparatus 10 is a server system, a storage apparatus, or a network device.

The local disk 102 stores a connection destination monitoring manager management table 1021, a monitoring information storage DB 1022, and a monitoring information collection definition management table 1023. Furthermore, the memory 103 stores a monitoring condition management table 1031, a primary apparatus event retransmission queue 1032, a secondary apparatus event retransmission queue 1033, and a monitoring agent 1034. These table structures and queue structures will be explained later (FIG. 5 to FIG. 9).

Figure 14:
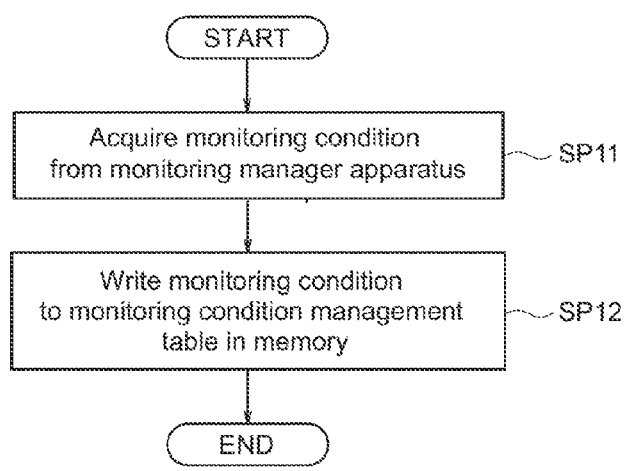
FIG. 14 is a flowchart illustrating monitoring condition acquisition processing.
Figure 15:
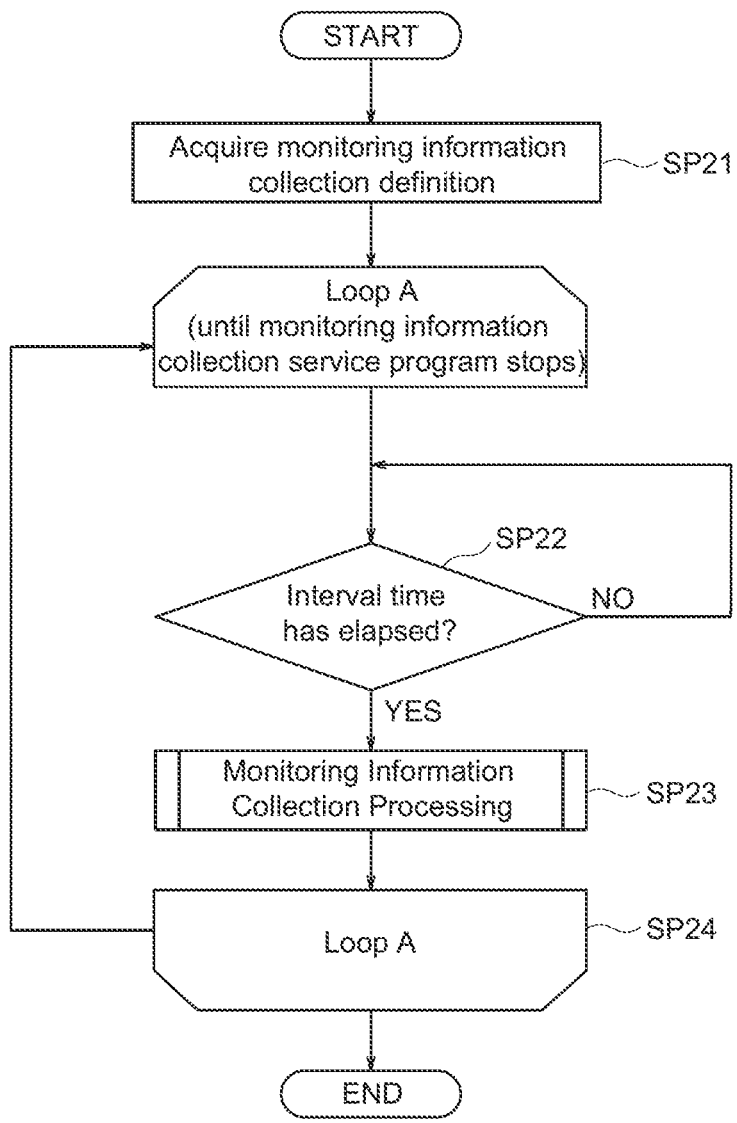
FIG. 15 is a flowchart illustrating monitoring information collection processing.
Figure 16:
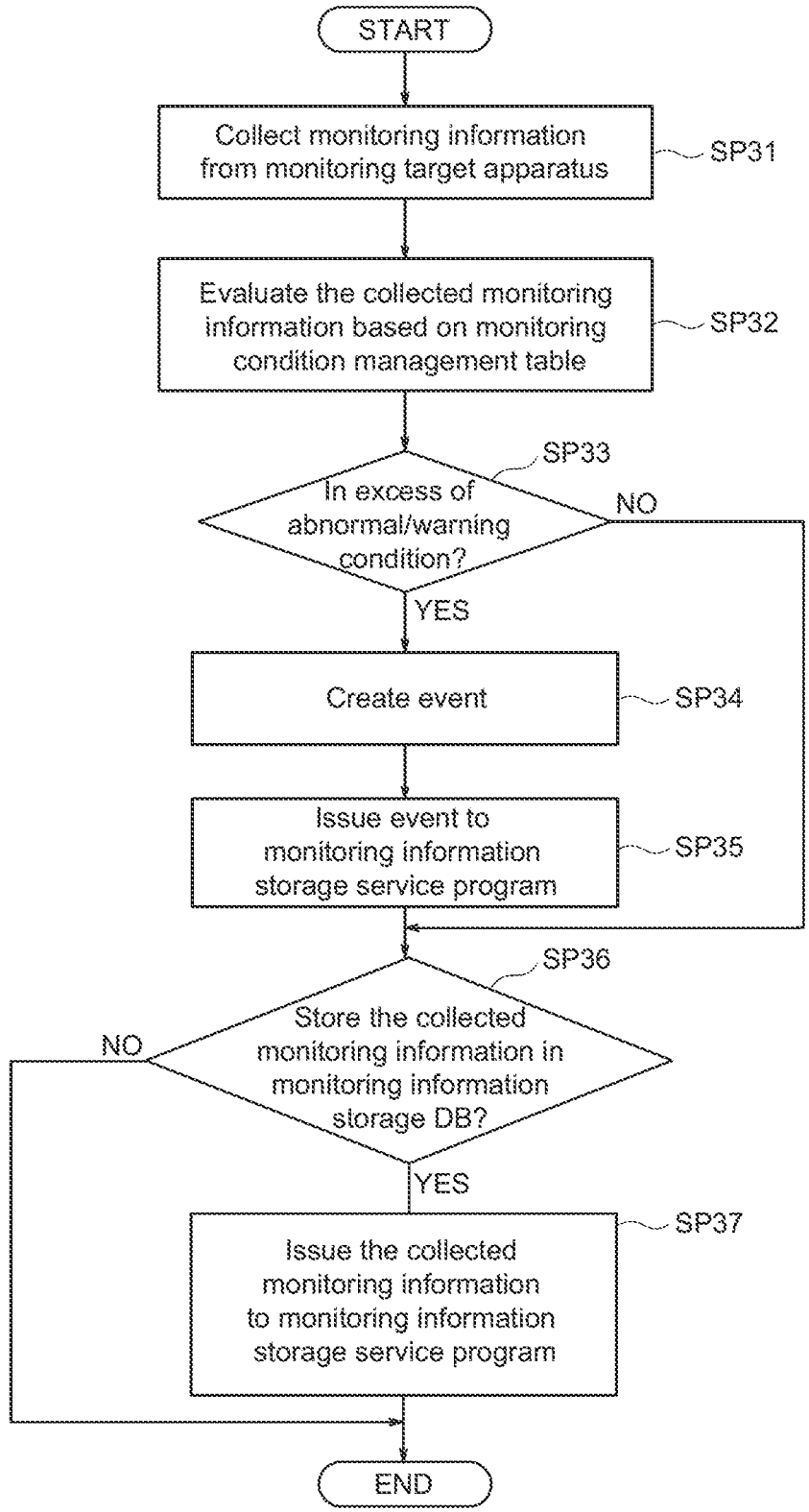
FIG. 16 is a flowchart illustrating the details of the monitoring information collection processing.

The monitoring agent 1034 is a program including a monitoring information collection service program P1 and a monitoring information storage service program P2. The monitoring information collection service program P1 is a program for having a monitoring information collection module P11 collect monitoring information from resources, having a monitoring information evaluation module P12 evaluate the collected monitoring information, and having an event creation module P13 generate an event based on the evaluation results. The details of processing executed by the monitoring information collection service program P1 will be described later (FIG. 14 to FIG. 16).

Furthermore, the monitoring information storage service program P2 is a program for issuing an event generated by an event issuing module P21 and having a monitoring information storage module P22 store the monitoring information in the monitoring information storage DB 1022. The details of processing executed by the monitoring information storage service program P2 will be described later (FIG. 17 to FIG. 21).

Figure 4:
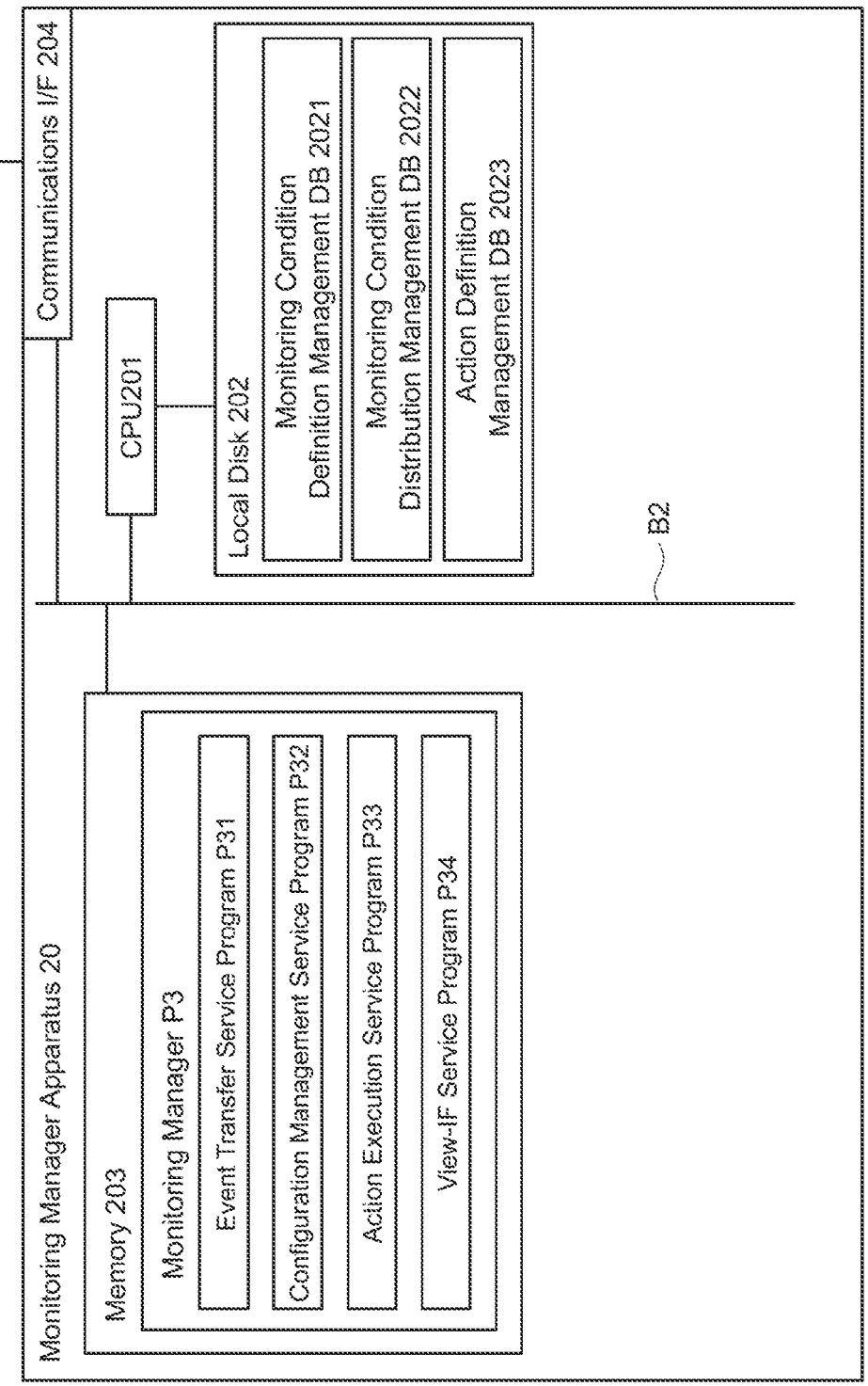
FIG. 4 is an internal configuration diagram of a monitoring manager apparatus.

FIG. 4 shows the internal configuration of the monitoring manager apparatus 20. The monitoring manager apparatus 20 includes a CPU 201 for generally controlling the operation of the monitoring manager apparatus 20, a local disk 202, a memory 203, and a communications I/F 204 for connecting to the communication path N1. Moreover, they are connected to each other via an internal bus B2 so that they can communicate with each other.

The local disk 202 stores a monitoring condition definition management DB 2021, a monitoring condition distribution destination management DB 2022, and an action definition management DB 2023. Each of their DB structures will be explained later (FIG. 10 to FIG. 12).

Figure 22:
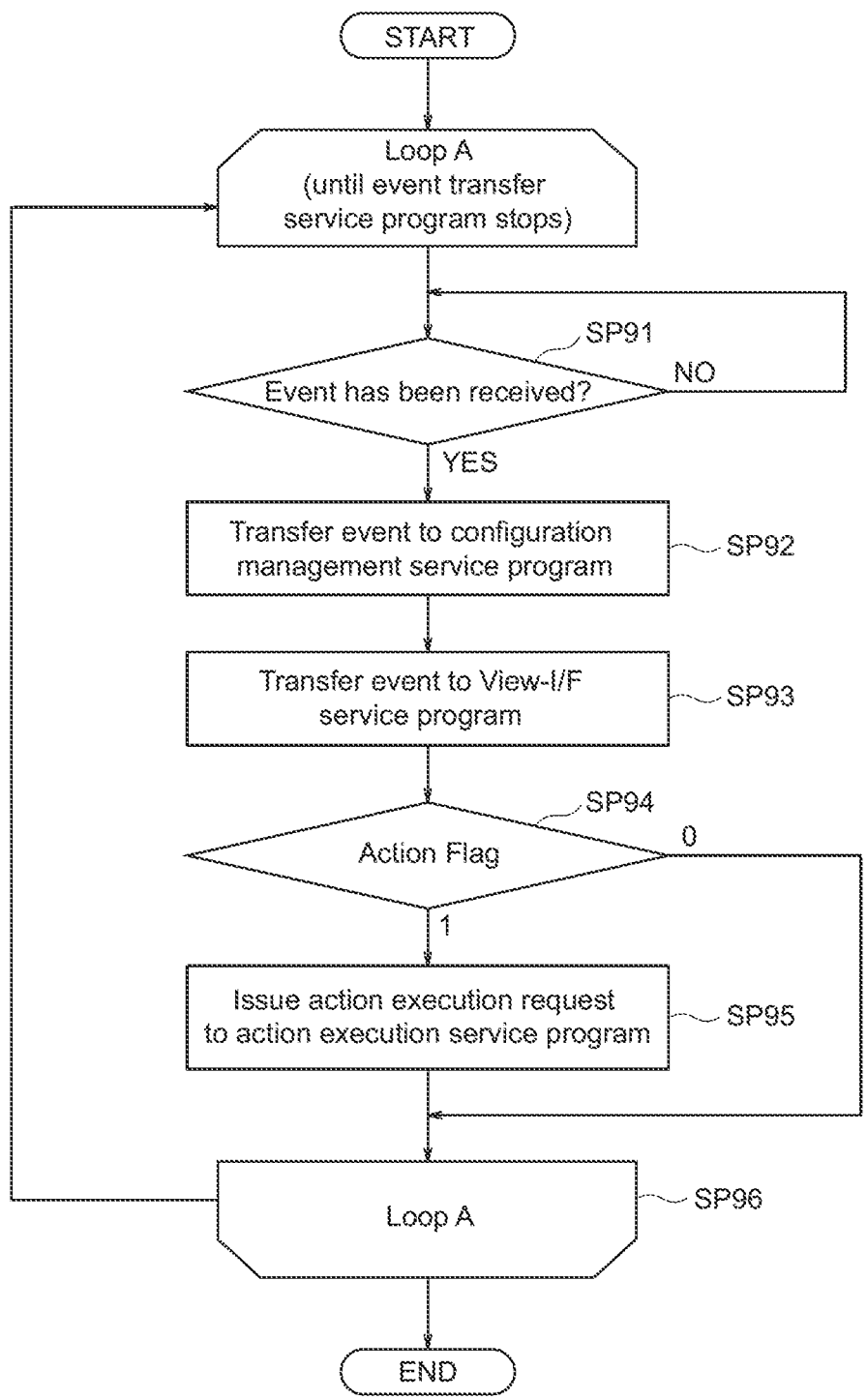
FIG. 22 is a flowchart illustrating event transfer processing.
Figure 23:
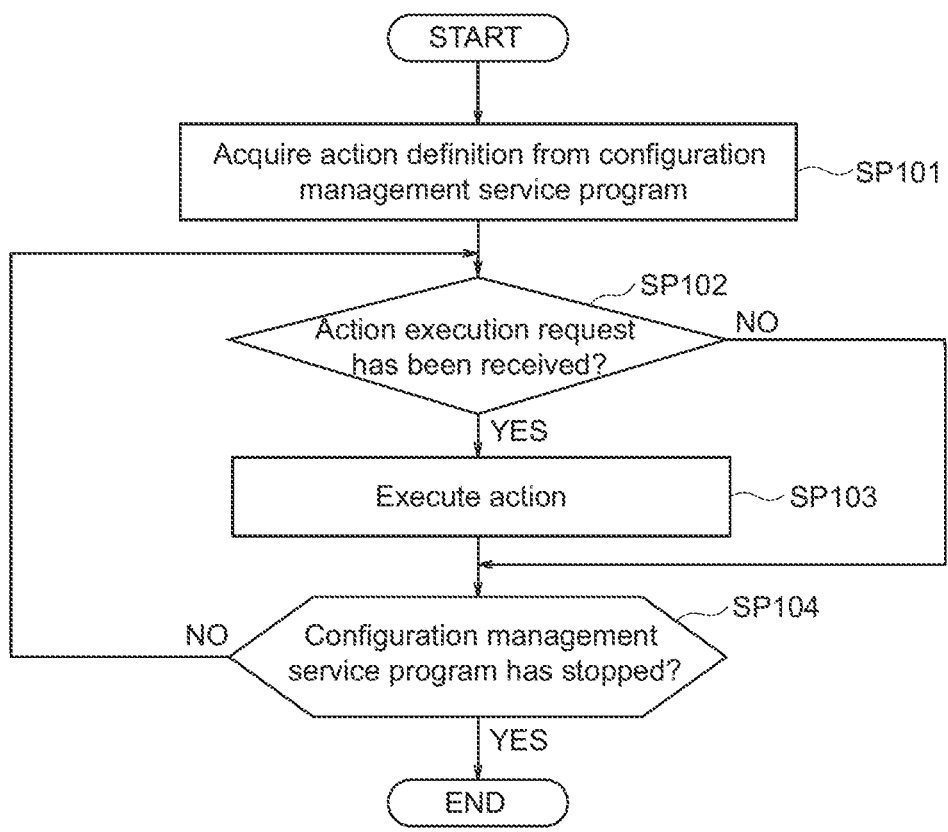
FIG. 23 is a flowchart illustrating action execution processing.

Furthermore, the memory 203 stores a monitoring manager P3. The monitoring manager P3 is a program including an event transfer service program P31, a configuration management service program P32, an action execution service program P33, and a View-I/F service program P34. The details of processing executed by the monitoring manager P3 based on these programs will be explained later (FIG. 22 and FIG. 23).

Next, each of various pieces of information stored in the monitoring target apparatus 10 will be explained with reference to FIG. 5 to FIG. 9. Moreover, various pieces of information stored in the monitoring manager apparatus 20 will be explained with reference to FIG. 10 to FIG. 12.

(1-4) Details of Each Structure

FIG. 5 shows a logical structure of the connection destination monitoring manager management table 1021. The connection destination monitoring manager management table 1021 is a table created by the administrator by presetting it in the monitoring target apparatus 10 and stores the monitoring manager apparatuses 20, which are destinations to be connected, and their priority information. This connection destination monitoring manager management table 1021 is used when communicating with the monitoring manager apparatus 20.

Specifically speaking, the connection destination monitoring manager management table 1021 includes a connection destination monitoring manager host column 10211 and a connection priority column 10212.

The connection destination monitoring manager host column 10211 stores an identifier of the monitoring manager apparatus 20 to which the monitoring target apparatus 10 connects. Furthermore, the connection priority column 10212 stores information indicating which monitoring manager apparatus 20 of the connection destination monitoring manager apparatuses 20 should be a primary apparatus (high priority) or a secondary apparatus (low priority).

Therefore, in the case of FIG. 5, it is shown that the monitoring target apparatus 10 which stores this connection destination monitoring manager management table 1021 is connected to two monitoring manager apparatuses 20, "host α" and "host β"; and the monitoring manager apparatus 20 which is "host α" is set as the primary apparatus and the monitoring manager apparatus 20 which is "host β" is set as the secondary apparatus.

FIG. 6 shows a logical structure of the monitoring information collection definition management table 1023. The monitoring information collection definition management table 1023 is a table created by the administrator by presetting it in the monitoring target apparatus 10 and stores information indicating whether or not to store the monitoring information in the monitoring information storage DB 1022, and information indicating a time interval for acquiring the monitoring information. This monitoring information collection definition management table 1023 is used to collect the monitoring information.

Specifically speaking, the monitoring information collection definition management table 1023 includes a monitored target column 10231, a whether-stored-in-DB-or-not column 10232, an interval column 10233, and an offset column 10234.

The monitored target column 10231 stores information about a monitored target resource among the resources of the monitoring target apparatus 10. Moreover, the whether-stored-in-DB-or-not column 10232 stores information indicating whether or not to store the monitoring information, which is collected from the resource, in the monitoring information storage DB 1022. Furthermore, the interval column 10233 stores information indicating the time interval for acquiring the monitoring information from the resource. Also, the offset column 10234 stores information indicating count start time after offset when offset is performed at previously designated time and timing for the purpose of load reduction.

Therefore, in the case of FIG. 6, it is shown that, for example, if the monitoring target resource is a "CPU," the collected monitoring information (CPU activity ratio) is to be stored in the monitoring information storage DB 1022 ("Y"); the activity ratio of this CPU is collected every "60" seconds; and if count time reaches the timing for offset, time which has been counted is offset to "0" and the count is started.

FIG. 7 shows a logical structure of the monitoring condition management table 1031. The monitoring condition management table 1031 is a table created by acquiring a monitoring condition, which was preset by the administrator in the monitoring manager apparatus 20, from the monitoring manager apparatus 20 and stores information of a threshold indicating whether or not to generate an event (monitoring condition). This monitoring condition management table 1031 is used to judge whether or not to generate an event by evaluating the collected monitoring information.

Specifically speaking, the monitoring condition management table 1031 includes a condition definition name column 10311, an anomaly condition column 10312, a warning condition column 10313, a monitoring time zone column 10314, and a message column 10315.

The condition definition name column 10311 stores a condition definition name. The anomaly condition column 10312 stores a threshold indicating whether the collected monitoring information is at an abnormal level or not. The warning condition column 10313 stores a threshold indicating whether the collected information is at a warning level or not. The monitoring time zone column 10314 stores information about a time zone during which the monitoring information is collected. The message column 10315 stores a message template displayed on a display screen of the monitoring console 30 when the collected monitoring information is at the abnormal or warning level.

Therefore, in the case of FIG. 7, it is shown that: for example, if the condition definition name is "CPU Monitoring," this entry stores the monitoring condition for the monitoring information collected from the CPU; and if the collected monitoring information (CPU activity ratio) is more than 90% ("CPU>90"), the relevant level is the abnormal level; and if the collected CPU activity ratio is equal to or less than 90% and more than 50% ("90≧CPU>50"), the relevant level is the warning level. Moreover, it is defined that the CPU activity ratio is always monitored ("Always"); and it is shown that if the relevant level is the abnormal level or the warning level, the collected CPU activity ratio is displayed as a message.

Figures 8, 9:
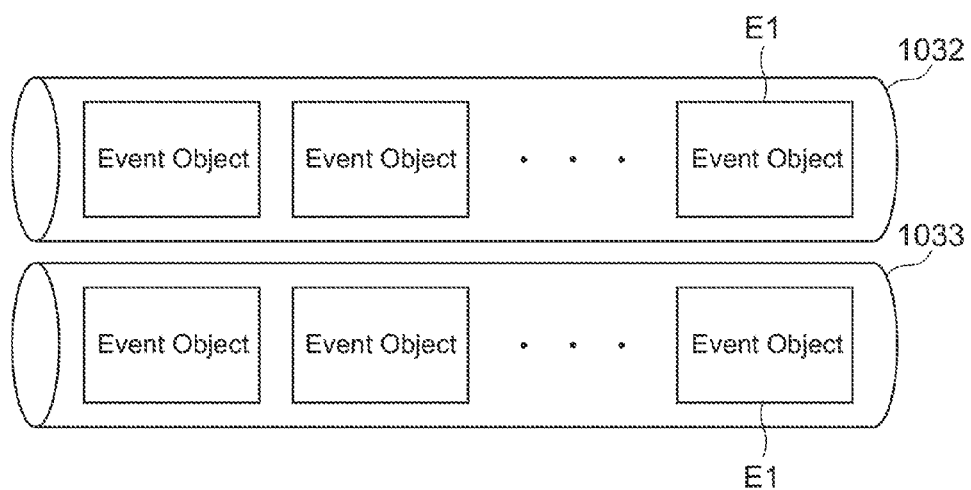
FIG. 8 is a logical configuration diagram of an event retransmission queue.
FIG. 9 is a logical configuration diagram of an event.

FIG. 8 shows a logical structure of the primary apparatus event retransmission queue 1032 and the secondary apparatus event retransmission queue 1033. The primary apparatus event retransmission queue 1032 and the secondary apparatus event retransmission queue 1033 store event E1 which should be retransmitted and is waiting to be retransmitted when its transmission from the monitoring target apparatus 10 to the monitoring manager apparatus 20 has failed.

The primary apparatus event retransmission queue 1032 stores the event E1 to be retransmitted to the monitoring manager apparatus 20 which is set as the primary apparatus; and the secondary apparatus event retransmission queue 1033 stores the event E1 to be retransmitted to the monitoring manager apparatus 20 which is set as the secondary apparatus. The same event E1 is stored in these queues.

FIG. 9 shows a logical structure of the event E1. The event E1 is generated when the collected monitoring information satisfies the monitoring condition managed by the monitoring condition management table 1031; and the event E1 stores information indicating that the relevant resource is at the abnormal level or the warning level, and information indicating whether an action should be executed or not. After this event E1 is generated, it is transmitted to the monitoring manager apparatus 20; and if the transmission fails, it is stored in the event retransmission queues 1032 and 1033.

Specifically speaking, the event E1 includes a condition definition name area E11, a monitored target host name area E12, a status area E13, a monitoring information area E14, an action flag area E15, and a data/time area E16.

The condition definition name area E11 stores a condition definition name. The monitored target host name area E12 stores an identifier of the monitoring target apparatus 10 having the resource evaluated as being at the abnormal level or the warning level. The status area E13 stores information indicating whether the abnormal level or the warning level. The monitoring information area E14 stores the collected monitoring information. The action flag area E15 stores a flag for requesting the execution of an action or a flag for not requesting the execution of an action (a flag for requesting the action execution to be stopped). The data/time area E16 stores a date and time when the event E1 was generated.

Therefore, in the case of FIG. 9, it is shown that since the condition definition name is "CPU Monitoring," this is an event about the monitoring information collected from the CPU (CPU activity ratio); the monitoring target apparatus 10 having this CPU is "host A"; and the activity ratio of the collected CPU is at an "Abnormal" level. It is also shown that the collected CPU activity ratio is "95"% and the monitoring manager apparatus 20 which receives this event is requested to execute the action ("action flag: 1"). Moreover, it is shown that this event was generated on "2012/11/01 12:00:00."

FIG. 10 shows a logical structure of the monitoring condition definition management DB 2021. The monitoring condition definition management DB 2021 is information created by the administrator by presetting it in the monitoring manager apparatus 20 and includes threshold information indicating whether to generate an event or not (monitoring condition). This monitoring condition definition management DB 2021 is master information of the monitoring condition management table 1031 and is used by the monitoring target apparatus 10 to create the monitoring condition management table 1031.

Specifically speaking, the monitoring condition definition management DB 2021 includes a condition definition name area 20211, a monitored target type area 20212, an anomaly condition area 20213, a warning condition area 20214, a monitoring time zone area 20215, and a message area 20216.

The condition definition name area 20211 stores a condition definition name. The monitored target type area 20212 stores the type of a monitored target. The anomaly condition area 20213 stores a threshold indicating whether the collected monitoring information is at the abnormal level or not. The warning condition area 20214 stores a threshold indicating whether the collected information is at the warning level or not. The monitoring time zone area 20215 stores information about a time zone during which the monitoring information is collected. When the collected monitoring information is at the abnormal or warning level, the message area 20216 stores a message template displayed on the display screen of the monitoring console 30.

Therefore, in the case of FIG. 10, it is shown that: for example, if the condition definition name is "CPU Monitoring," this entry stores the monitoring condition for the monitoring information collected from the CPU; and since the CPU is a target to be monitored target, a monitoring type "Platform" is stored; and it is defined that if the collected monitoring information (CPU activity ratio) is more than 90% ("CPU>90"), the relevant level is the abnormal level; and if the collected CPU activity ratio is equal to or less than 90% and more than 50% ("90≧CPU>50"), the relevant level is the warning level. Moreover, it is defined that the CPU activity ratio is always monitored ("Always"); and it is shown that if the relevant level is the abnormal level or the warning level, the collected CPU activity ratio is displayed as a message.

FIG. 11 shows a logical structure of the monitoring condition distribution destination management DB 2022. The monitoring condition distribution destination management DB 2022 is information created by the administrator by presetting it in the monitoring manager apparatus 20 and includes information indicating a location to which the monitoring condition defined by the monitoring condition definition management DB 2021 is distributed. This monitoring condition distribution destination management DB 2022 is used by the monitoring target apparatus 10 to create the monitoring condition management table 1031.

Specifically speaking, the monitoring condition distribution destination management DB 2022 includes a condition definition name area 20221 and a distribution target host area 20222.

The condition definition name area 20221 stores a condition definition name. Moreover, the distribution target host area 20222 stores an identification of the monitoring target apparatus 10 that is the location where the monitoring condition is distributed.

Therefore, in the case of FIG. 11, it is shown that the monitoring condition whose condition definition name is "CPU Monitoring" is distributed to two monitoring target apparatuses 10, "host A" and "host B."

FIG. 12 shows a logical structure of the action definition management DB 2023. The action definition management DB 2023 is information created by the administrator by presetting it in the monitoring manager apparatus 20 and includes information indicating the content of an action to be executed when an event is issued. This action definition management DB 2023 is used when the monitoring manager apparatus 20 executes the action.

Specifically speaking, the action definition management DB 2023 includes a condition definition name area 20231, an action condition area 20232, a mail area 20233, a command area 20234, an SNMP area 20235, and an action execution destination area 20236.

The condition definition name area 20231 stores a condition definition name. The action condition area 20232 stores information indicating an anomaly or a warning as an action condition. The mail area 20233 stores information indicating whether or not to issue mail as the content of the action. The command area 20234 stores information indicating whether or not to issue a command as the content of the action, and the content of the command when it is issued. The SNMP area 20235 stores information indicating whether or not to monitor or control a monitoring target apparatus 10 (particularly, a network device) connected to the communication path N1, using the SNMP (Simple Network Management Protocol).

Therefore, in the case of FIG. 12, it is shown that, for example, if the condition definition name is "Memory Monitoring" and the action condition is "Warning," mail is issued as the content of the action.

Figure 13:
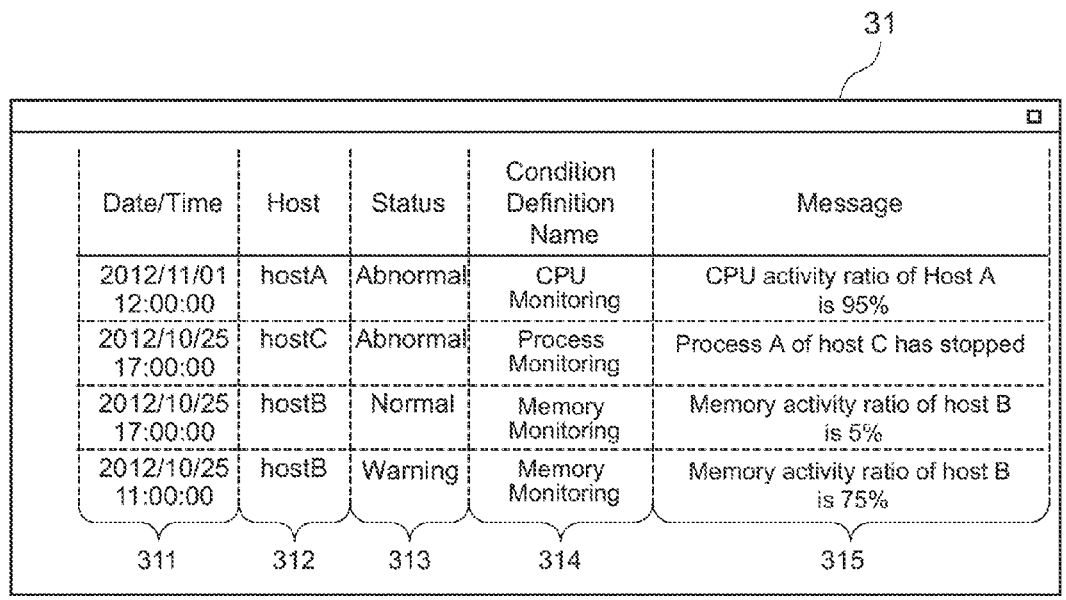
FIG. 13 is a screen configuration diagram displayed on a monitoring console.

FIG. 13 shows a screen structure of the display screen 31 for the monitoring console 30. The display screen 31 is a screen displayed when the administrator operates the monitoring console 30; and histories of events and monitoring information received by the monitoring manager apparatus 20 are displayed.

Specifically speaking, the display screen 31 includes a data/time column 311, a host column 312, a status column 313, a condition definition name column 314, and a message column 315.

The data/time column 311 displays a date and time when the relevant event was received. The host column 312 displays an identifier of the monitoring target apparatus 10. The status column 313 displays information indicating that the monitoring target apparatus 10 which has issued the event is at an abnormal level, a warning level, or a normal level. The condition definition name column 314 displays the condition definition name. The message column 315 displays a message about a resource which has collected the monitoring information.

Therefore, in the case of FIG. 13, it is shown that an event indicating that the CPU activity ratio is "Abnormal" was received from the monitoring target apparatus 10 "host A" on the date and time "2012/11/01 12:00:00."

(1-5) Flowcharts

FIG. 14 illustrates a processing sequence of monitoring condition acquisition processing. This monitoring condition acquisition processing is executed based on the monitoring agent 1034 (the monitoring information collection service program P1) and the CPU 102 as triggered by activation of the monitoring agent 1034. The monitoring agent 1034 will be explained as a processing subject for the purpose of illustration.

The monitoring agent 1034 firstly issues a monitoring condition acquisition request to the monitoring manager apparatus 20 and acquires a monitoring condition from the monitoring manager apparatus 20 (SP11). Incidentally, after receiving the monitoring condition acquisition request issued from the monitoring agent 1034, the monitoring manager apparatus 20 refers to the monitoring condition distribution destination management DB 2022 and acquires a condition definition name (for example, CPU monitoring) required for the monitoring agent 1034 which issued the monitoring condition acquisition request. Next, the monitoring manager apparatus 20 refers to the monitoring condition definition management DB 2021 and acquires the monitoring condition (for example, an entry for the CPU monitoring) corresponding to the previously acquired condition definition name. Then, the monitoring manager apparatus 20 transmits the acquired monitoring condition to the monitoring agent 1034.

Then, after receiving the monitoring condition issued from the monitoring manager apparatus 20, the monitoring agent 1034 writes the received monitoring condition to the monitoring condition management table 1031 in the memory 103 (SP12) and terminates this processing.

FIG. 15 illustrates a processing sequence of monitoring information collection processing. This monitoring information collection processing is executed based on the monitoring agent 1034 (the monitoring information collection service program P1) and the CPU 102 as triggered by the acquisition of the monitoring condition by the monitoring agent 1034.

Firstly, the monitoring agent 1034 accesses the local disk 102 and acquires the monitoring information collection definition management table 1023 (SP21). Then, the monitoring agent 1034 judges whether the interval time has elapsed or not, by referring to the acquired monitoring information collection definition management table 1023 (SP22).

If the monitoring agent 1034 obtains a negative result for this judgment, it repeats this judgment until the interval time elapses. On the other hand, if the monitoring agent 1034 obtains an affirmative result for this judgment, it executes monitoring information collection processing (SP23). The details of this monitoring information collection processing will be explained later (FIG. 16).

Next, the monitoring agent 1034 judges whether or not an instruction to stop the monitoring information collection service program P1 has been issued or not (SP24). Incidentally, it is possible to issue the instruction to stop the monitoring information collection service program P1 by, for example, having a service engineer or an administrator execute arbitrary operation on the monitoring target apparatus 10. If the monitoring agent 1034 obtains a negative result for this judgment, the monitoring agent 1034 proceeds to step SP22 and continues repeating the aforementioned processing of loop A. On the other hand, if the monitoring agent 1034 obtains an affirmative result for this judgment, it terminates this processing.

FIG. 16 illustrates a detailed processing sequence of the monitoring information collection processing. This monitoring information collection processing is executed based on the monitoring agent 1034 (the monitoring information collection service program P1) and the CPU 102 as triggered when the processing in the monitoring information collection processing (FIG. 15) proceeds to step SP23.

Firstly, the monitoring agent 1034 collects the monitoring information from the monitoring target apparatus 10 (SP31) and evaluates the collected monitoring information by referring to the monitoring condition management table 1031 (SP32). For example, if the collected monitoring information is information indicating that the CPU activity ratio is 90%, and since the relevant level is the abnormal level in a case of the CPU activity ratio >90% with reference to the monitoring condition management table 1031, the monitoring agent 1034 can evaluate the monitoring target apparatus 10, from which the monitoring information is collected, as being in an abnormal state.

The monitoring agent 1034 judges if the collected monitoring information exceeds an abnormal/warning condition or not (SP33). If the monitoring agent 1034 obtains a negative result for this judgment, it proceeds to step SP36. On the other hand, if the monitoring agent 1034 obtains an affirmative result for this judgment, it generates an event (SP34). Then, the monitoring agent 1034 issues the generated event to the monitoring information storage service program P2 (SP35).

The monitoring agent 1034 judges whether to store the monitoring information, which was collected in step SP31, in the monitoring information storage DB 1022 or not, by referring to the monitoring information collection definition management table 1023 (SP36). If the monitoring agent 1034 obtains a negative result for this judgment, it terminates this processing without storing the collected monitoring information in the monitoring information storage DB 1022. On the other hand, if the monitoring agent 1034 obtains an affirmative result for this judgment, it issues the collected monitoring information to the monitoring information storage service program P2 (SP37) and terminates this processing.

Figure 17:
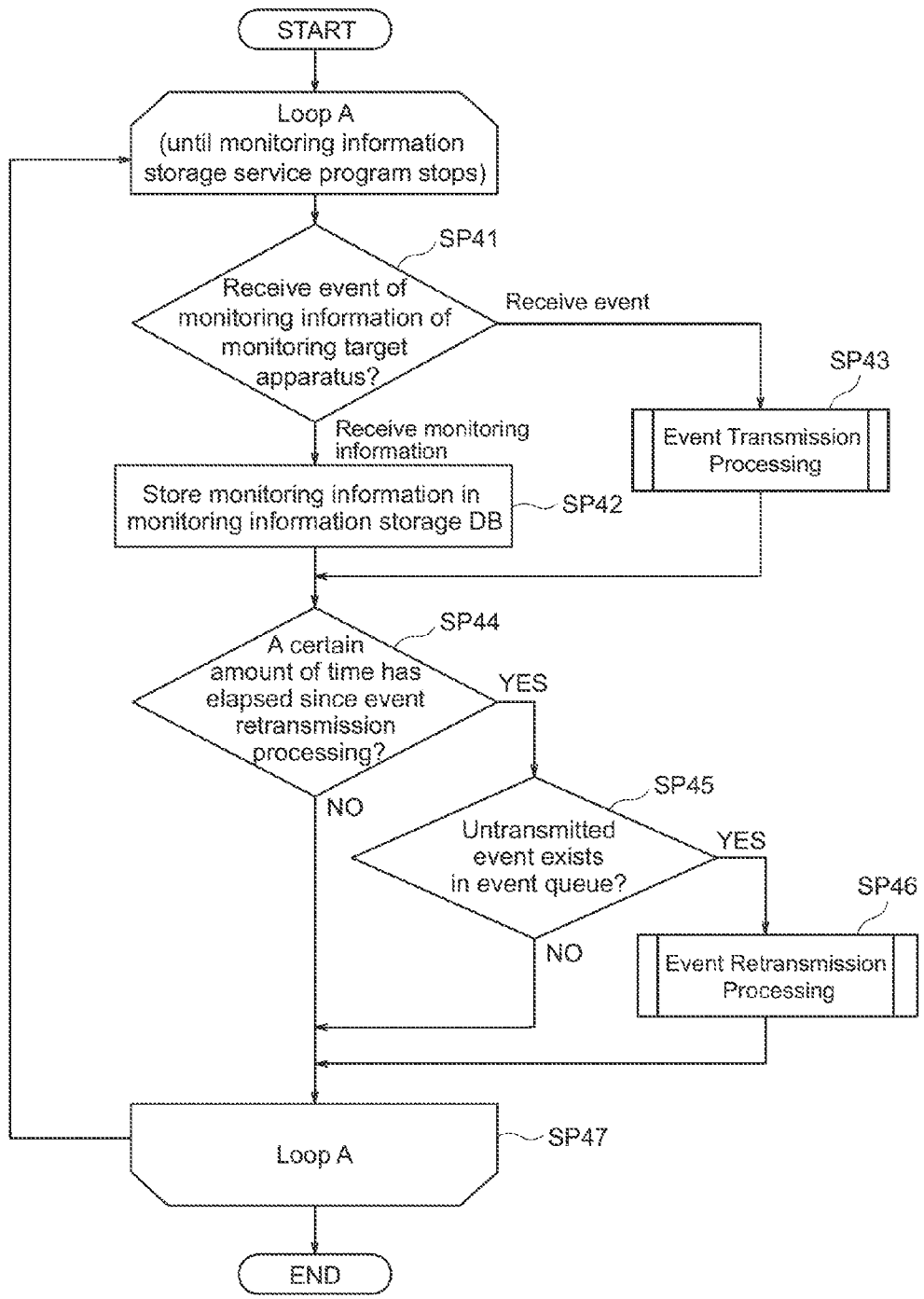
FIG. 17 is a flowchart illustrating event transmission processing.

FIG. 17 illustrates a processing sequence of event transmission processing. This event transmission processing is executed based on the monitoring agent 1034 (the monitoring information storage service program P2) and the CPU 102 as triggered when the monitoring information storage service program P2 receives the monitoring information or event issued from the monitoring information collection service program P1.

Figure 18:
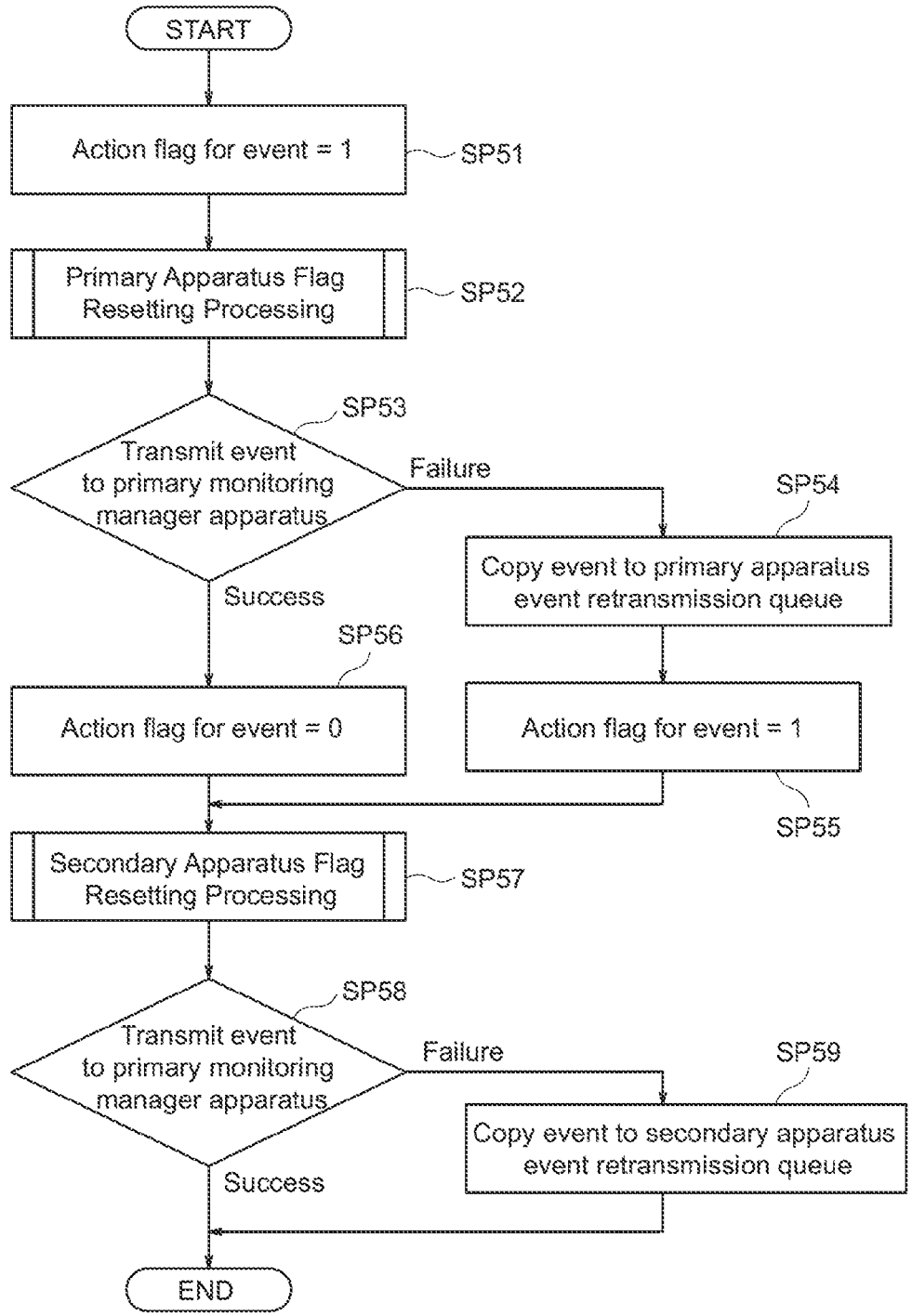
FIG. 18 is a flowchart illustrating the details of event retransmission processing.

Firstly, the monitoring agent 1034 judges whether it has received the event or monitoring information issued from the monitoring information collection service program P1 (SP41). If the monitoring agent 1034 determines as a result of this judgment that it has received the monitoring information, it stores the received monitoring information in the monitoring information storage DB 1022 (SP42). On the other hand, if the monitoring agent 1034 determines as a result of this judgment that it has received the event, it executes event transmission processing for transmitting the received event to the monitoring manager apparatus 20 (SP43). The details of the event transmission processing will be explained later (FIG. 18).

Next, the monitoring agent 1034 judges whether or not a certain amount of time has elapsed since the event retransmission processing after storing the monitoring information or transmitting the event (SP44). If the monitoring agent 1034 obtains a negative result for this judgment, it proceeds to step SP47. On the other hand, if the monitoring agent 1034 obtains an affirmative result for this judgment, it judges whether any untransmitted event exists in the event retransmission queues 1032 and 1033 or not (SP45).

Figure 19:
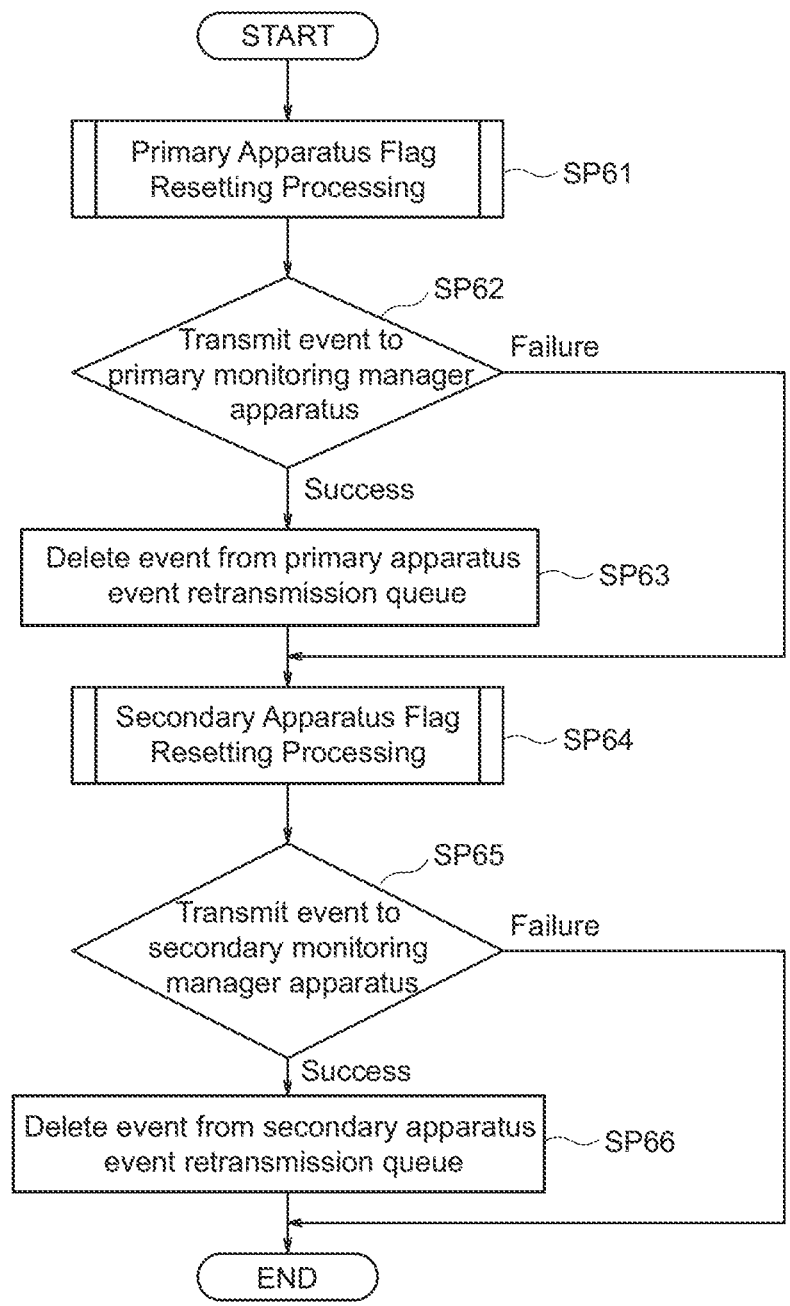
FIG. 19 is a flowchart illustrating the details of the event retransmission processing.

If the monitoring agent 1034 obtains an affirmative result for this judgment, it executes the event retransmission processing (SP46). The details of this event retransmission processing will be explained later (FIG. 19). On the other hand, if the monitoring agent 1034 obtains a negative result for this judgment, it proceeds to step SP47.

Subsequently, the monitoring agent 1034 judges whether or not an instruction to stop the monitoring information storage service program P2 has been issued or not (SP47). If the monitoring agent 1034 obtains a negative result for this judgment, it proceeds to step SP41 and continues repeating the aforementioned processing of loop A. On the other hand, if the monitoring agent 1034 obtains an affirmative result for this judgment, it terminates this processing.

FIG. 18 illustrates a detailed processing sequence of the event transmission processing. This event transmission processing is executed based on the monitoring agent 1034 (the monitoring information storage service program P2) and the CPU 102 as triggered when the processing in the event transmission processing (FIG. 17) proceeds to step SP43.

Firstly, the monitoring agent 1034 sets an action flag of the event to 1 (SP51). Incidentally, the event in this example is not an event stored in the event retransmission queues 1032 and 1033, but is an event which is to be transmitted to the monitoring manager apparatus 20 right now.

Next, the monitoring agent 1034 executes primary apparatus flag resetting processing (SP52). The details of the primary apparatus flag resetting processing will be explained later (FIG. 20); however, briefly speaking, the primary apparatus flag resetting processing is processing executed, when the primary apparatus event retransmission queue 1032 stores an event(s) waiting to be transmitted besides the event to be transmitted right now to the monitoring manager apparatus 20 which is set as the primary apparatus, to also transmit the event(s), which is stored in the primary apparatus event retransmission queue 1032 and is waiting to be transmitted, at the same time. When this happens, this processing is to set the action flag of all events, which are stored in the primary apparatus event retransmission queue 1032 to be transmitted, to 1 or 0.

After executing the primary apparatus flag resetting processing, the monitoring agent 1034 transmits the event to the monitoring manager apparatus 20, which is set as the primary apparatus, and then judges whether the transmission has been successful or failed (SP53).

Regarding the event which has failed to be transmitted, the monitoring agent 1034 copies the event and stores it in the primary apparatus event retransmission queue 1032 (SP54). Then, since the transmission has failed, the monitoring agent 1034 sets the action flag to 1 (SP55).

On the other hand, regarding the event which has been successfully transmitted, the monitoring agent 1034 sets the action flag of this event to 0 without storing it in the primary apparatus event retransmission queue 1032 (SP56).

Next, the monitoring agent 1034 executes secondary apparatus flag resetting processing (SP57). The details of the secondary apparatus flag resetting processing will be explained later (FIG. 21); however, briefly speaking, the secondary apparatus flag resetting processing is processing executed, when the secondary apparatus event retransmission queue 1033 stores an event(s) waiting to be transmitted besides the event to be transmitted right now to the monitoring manager apparatus 20 which is set as the secondary apparatus, to also transmit the event(s), which is stored in this secondary apparatus event retransmission queue 1033 and is waiting to be transmitted, at the same time. When this happens, this processing is to set the action flag of all events, which are stored in this secondary apparatus event retransmission queue 1033 to be transmitted, to 1 or 0.

After executing the secondary apparatus flag resetting processing, the monitoring agent 1034 transmits the event to the monitoring manager apparatus 20, which is set as the secondary apparatus, and then judges whether the transmission has been successful or failed (SP58).

Regarding the event which has failed to be transmitted, the monitoring agent 1034 copies the event and stores it in the secondary apparatus event retransmission queue 1033 (SP59) and terminates this processing.

On the other hand, regarding the event which has been successfully transmitted, the monitoring agent 1034 determines that the event which was intended to be transmitted has been successfully transmitted to the monitoring manager apparatus 20 as the secondary apparatus and all the events which were stored in the secondary apparatus event retransmission queue 1033 and waiting to be transmitted have been successfully transmitted; and then terminates this processing.

FIG. 19 illustrates a detailed processing sequence of event retransmission processing. This event retransmission processing is executed based on the monitoring agent 1034 (the monitoring information storage service program P2) and the CPU 102 as triggered when the processing in the event transmission processing (FIG. 17) proceeds to step SP46.

Figure 20:
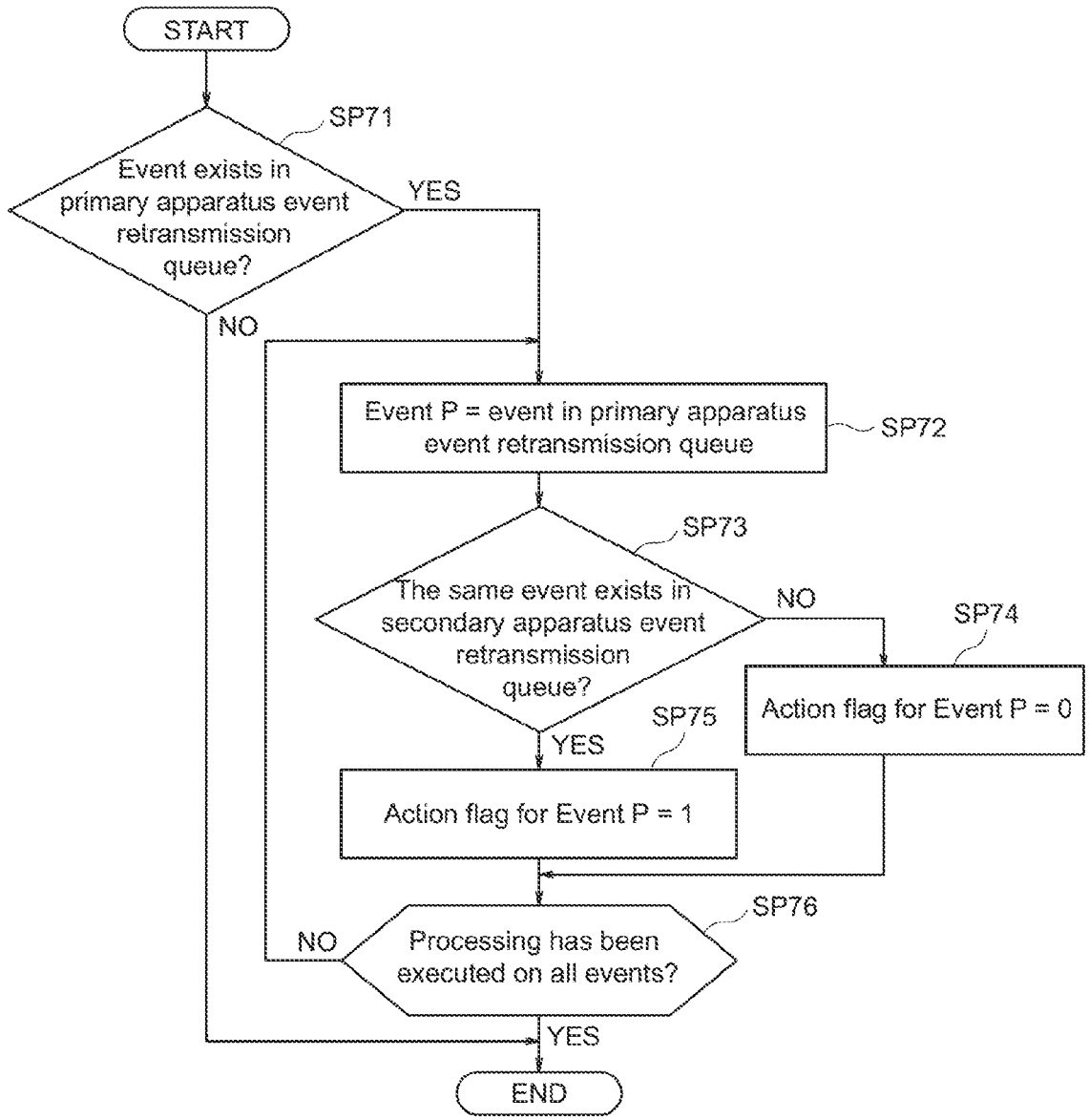
FIG. 20 is a flowchart illustrating primary apparatus flag reselling processing.

Firstly, the monitoring agent 1034 executes primary apparatus flag resetting processing (SP61). The primary apparatus flag resetting processing is processing for setting the action flag of all the events, which are stored in the primary apparatus event retransmission queue 1032 and are waiting to be transmitted as described above, to 1 or 0 and the details of the processing will be explained later (FIG. 20).

Next, after executing the primary apparatus flag resetting processing, the monitoring agent 1034 executes processing for transmitting all the events stored in the primary apparatus event retransmission queue 1032 to the monitoring manager apparatus 20, which is set as the primary apparatus, and judging whether the transmission has been successful or failed (SP62).

Regarding the event which has been successfully transmitted, the monitoring agent 1034 deletes it from the primary apparatus event retransmission queue 1032 (SP63) and proceeds to step SP64.

Figure 21:
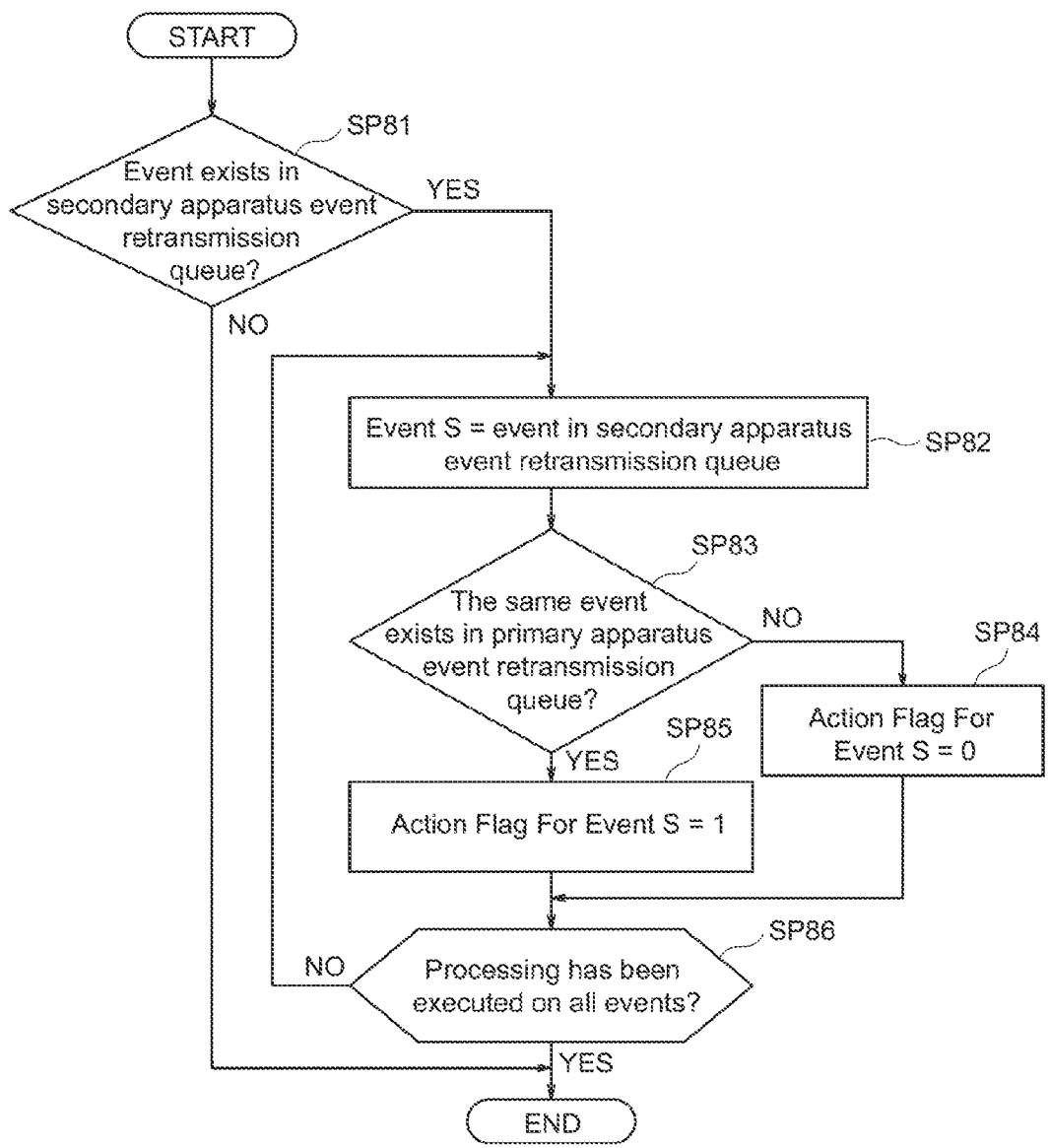
FIG. 21 is a flowchart illustrating secondary apparatus flag resetting processing.

On the other hand, regarding the event which has failed to be transmitted, the monitoring agent 1034 executes the secondary apparatus flag resetting processing (SP64). The secondary apparatus flag resetting processing is processing for setting the action flag of all the events, which are stored in the secondary apparatus event retransmission queue 1033 and are waiting to be transmitted as described above, to 1 or 0 and the details of the processing will be explained later (FIG. 21).

Then, after executing the secondary apparatus flag resetting processing, the monitoring agent 1034 executes processing for transmitting all the events stored in the secondary apparatus event retransmission queue 1033 to the monitoring manager apparatus 20, which is set as the secondary apparatus, and judging whether the transmission has been successful or failed (SP65).

Regarding the event which has failed to be transmitted, the monitoring agent 1034 terminates this processing. On the other hand, regarding the event which has been successfully transmitted, the monitoring agent 1034 deletes it from the secondary apparatus event retransmission queue 1033 (SP66) and terminates this processing.

FIG. 20 illustrates a processing sequence of the primary apparatus flag resetting processing. This primary apparatus flag resetting processing is executed based on the monitoring agent 1034 (the monitoring information storage service program P2) and the CPU 102 as triggered when the processing in the event transmission processing (FIG. 18) proceeds to step SP52 or the processing in the event retransmission processing (FIG. 19) proceeds to step SP61.

Firstly, the monitoring agent 1034 judges whether there is any event stored in the primary apparatus event retransmission queue 1032 (SP71). If the monitoring agent 1034 obtains a negative result for this judgment, no event for which the action flag should be reset exists in the queue and, therefore, the monitoring agent 1034 terminates this processing.

On the other hand, if the monitoring agent 1034 obtains an affirmative result for this judgment, it extracts any one of the events stored in the primary apparatus event retransmission queue 1032 as a processing target and sets this as event P (SP72).

Subsequently, the monitoring agent 1034 judges whether the same event as event P extracted as the processing target exists in the secondary apparatus event retransmission queue 1033 or not (SP73).

If the monitoring agent 1034 obtains a negative result for this judgment, that is, if the same event as event P does not exist in the secondary apparatus event retransmission queue 1033, the monitoring agent 1034 determines that the same event as event P has already been transmitted to the monitoring manager apparatus 20 which is set as the secondary apparatus. Now, assuming that the action flag of the first transmitted event is set to 1, the action flag of the event transmitted to the monitoring manager apparatus 20, which is set as the secondary apparatus, is set to 1. Therefore, the monitoring agent 1034 sets the action flag of this event P to 0 (SP74).

On the other hand, if the monitoring agent 1034 obtains an affirmative result for this judgment, it determines that the same event as event P has never been transmitted to the monitoring manager apparatus 20 which is set as the secondary apparatus. Therefore, the monitoring agent 1034 sets the action flag of this event P to 1 (SP75).

The monitoring agent 1034 judges whether or not the processing from step SP72 to step SP75 has been executed on all the events stored in the secondary apparatus event retransmission queue 1033 (SP76). If the monitoring agent 1034 obtains a negative result for this judgment, it proceeds to step SP72 and repeats the aforementioned processing. On the other hand, if the monitoring agent 1034 obtains a negative result for this judgment, it terminates this processing.

FIG. 21 illustrates a processing sequence of secondary apparatus flag resetting processing. This secondary apparatus flag resetting processing is executed based on the monitoring agent 1034 (the monitoring information storage service program P2) and the CPU 102 as triggered when the processing in the event transmission processing (FIG. 18) proceeds to step SP57 or the processing in the event retransmission processing (FIG. 19) proceeds to step SP64.

Firstly, the monitoring agent 1034 judges whether or not there is any event stored in the secondary apparatus event retransmission queue 1033 (SP81). If the monitoring agent 1034 obtains a negative result for this judgment, no event for which the action flag should be reset exists in the queue and, therefore, the monitoring agent 1034 terminates this processing.

On the other hand, if the monitoring agent 1034 obtains an affirmative result for this judgment, it extracts any one of the events stored in the secondary apparatus event retransmission queue 1033 as a processing target and sets this as event S (SP82).

Subsequently, the monitoring agent 1034 judges whether or not the same event as event S extracted as the processing target exists in the primary apparatus event retransmission queue 1032 (SP83).

If the monitoring agent 1034 obtains a negative result for this judgment, that is, if the same event as event S does not exist in the primary apparatus event retransmission queue 1032, the monitoring agent 1034 determines that the same event as event S has already been transmitted to the monitoring manager apparatus 20 which is set as the primary apparatus. Now, assuming that the action flag of the first transmitted event is set to 1, the action flag of the event transmitted to the monitoring manager apparatus 20, which is set as the primary apparatus, is set to 1. Therefore, the monitoring agent 1034 sets the action flag of this event S to 0 (SP84).

On the other hand, if the monitoring agent 1034 obtains an affirmative result for this judgment, it determines that the same event as event S has never been transmitted to the monitoring manager apparatus 20 which is set as the primary apparatus. Therefore, the monitoring agent 1034 sets the action flag of this event S to 1 (SP85).

The monitoring agent 1034 judges whether or not the processing from step SP82 to step SP85 has been executed on all the events stored in the primary apparatus event retransmission queue 1032 (SP86). If the monitoring agent 1034 obtains a negative result for this judgment, it proceeds to step SP82 and repeats the aforementioned processing. On the other hand, if the monitoring agent 1034 obtains a negative result for this judgment, it terminates this processing.

FIG. 22 illustrates a processing sequence of event transfer processing. This event transfer processing is executed based on the monitoring manager P3 (the event transfer service program P31) and the CPU 201 as triggered when the monitoring manager P3 (the event transfer service program P31) receives the event transmitted from the monitoring agent 1034. For the purpose of illustration, the monitoring manager P3 will be explained as a processing subject.

Firstly, the monitoring manager P3 judges whether it has received an event or not (SP91). If the monitoring manager P3 obtains a negative result for this judgment, it waits to receive an event. On the other hand, if the monitoring manager P3 obtains an affirmative result for this judgment, it transfers the received event to the configuration management service program P32 (SP92). After receiving the event, the configuration management service program P32 enables the monitoring manager apparatus 20 to centrally manage the status of the monitoring target apparatus 10 by, for example, accumulating the received event(s).

Then, the monitoring manager P3 transfers the received event to the View-I/F service program P34 (SP93). After receiving the event, the View-I/F service program P34 transfers the received event to the monitoring console 30 so that the content of the event can be viewed on the display screen of the monitoring console 30.

Subsequently, the monitoring manager P3 judges whether the action flag of the received event is 0 or 1 (SP94). If the action flag is 0, the monitoring manager P3 proceeds to step SP96. On the other hand, if the action flag is 1, the monitoring manager P3 issues an action execution request to the action execution service program P33 (SP95) and proceeds to step SP96.

The monitoring manager P3 judges whether or not an instruction to stop the event transfer service program P31 has been issued or not (SP96). If the monitoring manager P3 obtains a negative result for this judgment, it proceeds to step SP91 and continues repeating the aforementioned processing of loop A. On the other hand, if the monitoring manager P3 obtains an affirmative result for this judgment, it terminates this processing.

FIG. 23 illustrates a processing sequence of action execution processing. This action execution processing is executed based on the monitoring manager P3 (the action execution service program P33) and the CPU 201 as triggered when the processing in the event transfer processing (FIG. 22) proceeds to step SP95 and the action execution service program P33 receives the action execution request issued from the event transfer service program P31.

Firstly, the monitoring manager P3 has the configuration management service program P32 refer to the action definition management DB 2023 and acquires an action definition indicating the content of an action (SP101). For example, the monitoring manager P3 acquires mail, a command, and SNMP, which are associated with the condition definition name, as the action definition.

Next, the monitoring manager P3 judges whether it has received an action execution request or not (SP102). If the monitoring manager P3 obtains a negative result for this judgment, it proceeds to step SP104. On the other hand, if the monitoring manager P3 obtains an affirmative result for this judgment, it executes the action (SP103) and proceeds to step SP104.

The monitoring manager P3 judges whether an instruction to stop the configuration management service program P32 has been issued or not (SP104). If the monitoring manager P3 obtains a negative result for this judgment, it proceeds to step SP102 and continues repeating the aforementioned processing. On the other hand, if the monitoring manager P3 obtains an affirmative result for this judgment, it terminates this processing.

(1-6) Advantageous Effect of this Embodiment

If the monitoring manager apparatuses 20 having the double active configuration are employed and the monitoring agent 1034 generates an event, the monitoring system 1 according to this embodiment as described above is designed to issue the event to all the monitoring manager apparatuses 20. So, even if either one of the monitoring manager apparatuses 20 stops, the other monitoring manager apparatus 20 which has received the event issued from the monitoring agent 1034 can be made to continue monitoring control. Therefore, it is possible to avoid monitoring control from stopping.

Furthermore, since this embodiment is designed so that the monitoring agent 1034 controls the receiver, to which the action execution request is issued, and issues the action execution request to only either one of the monitoring manager apparatuses 20, it is possible to prevent fault execution of the action which occurs when the monitoring manager apparatuses 20 having the double active configuration are simply employed.

Therefore, since it is possible according to this embodiment to avoid monitoring control from stopping and prevent fault execution of the action, monitoring control can be operated continuously stably.

(2) Second Embodiment

The difference between a second embodiment and the first embodiment is that according to the second embodiment, the monitoring target apparatus 10 retains one common event retransmission queue without retaining two queues, that is, the primary apparatus event retransmission queue 1032 and the secondary apparatus event retransmission queue 1033, separately in the memory 103. Another difference is that as one common event retransmission queue is retained, an event to be stored in the event retransmission queue is made to include information indicating whether or not to transmit the event to the primary apparatus and the secondary apparatus. The differences will be explained below in detail with reference to the relevant drawings.

(2-1) Details of Each Structure

Figure 24:
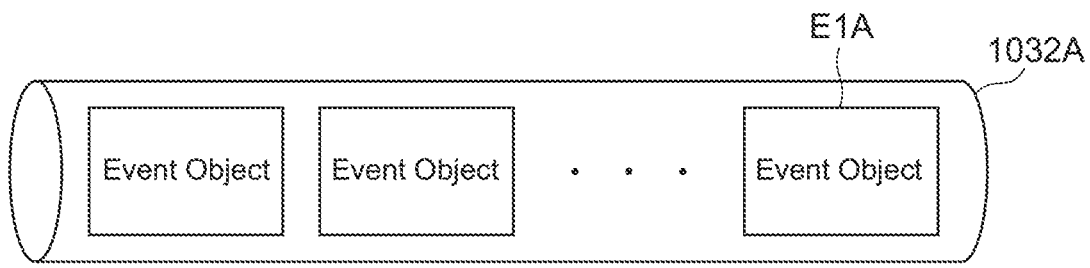
FIG. 24 is a logical configuration diagram of an event queue according to a second embodiment.

FIG. 24 shows a logical structure of an event retransmission queue 1032A. The event retransmission queue 1032A stores event E1A to be retransmitted when the event was transmitted from the monitoring target apparatus 10 to the monitoring manager apparatus 20, but the transmission has failed. The event retransmission queue 1032A stores event E1A to be retransmitted to a monitoring manager apparatus 20, which is set as a primary apparatus, or event E1A to be retransmitted to a monitoring manager apparatus 20 which is set as a secondary apparatus. Specifically speaking, even if the event has already been transmitted to either one of the monitoring manager apparatuses 20, which are the primary apparatus and the secondary apparatus, and has not been transmitted to the other monitoring manager apparatus 20, the untransmitted event is stored in this event retransmission queue 1032A. If the event is retransmitted to both the monitoring manager apparatuses 20 which are the primary apparatus and the secondary apparatus, event E1A in this queue is deleted.

FIG. 25 shows a logical structure of event E1A. Event E1A is generated when the collected monitoring information satisfies the monitoring condition managed by the monitoring condition management table 1031; and event E1A stores information indicating that the relevant level is an abnormal level or a warning level, and information indicating whether or not to execute an action. When this event E1A is generated, it is transmitted to both the monitoring manager apparatuses 20 which are the primary apparatus and the secondary apparatus; and if the transmission to either one of them has been successful and the transmission to the other monitoring manager apparatus 20 has failed, event E1A is stored in the event retransmission queue 1032A.

Specifically speaking, event E1A includes a condition definition name area E11A, a monitored target host name area E12A, a status area E13A, a monitoring information area E14A, an action flag area E15A, a data/time area E16A, a whether-transmitted-to-primary-apparatus-or-not area E17A, and a whether-transmitted-to-secondary-apparatus-or-not area E18A.

The condition definition name area E11A stores a condition definition name. The monitored target host name area E12A stores an identifier of a monitoring target apparatus 10 having a resource evaluated as being at the abnormal level or the warning level. The status area E13A stores information indicating whether the abnormal level or the warning level. The monitoring information area E14A stores the collected monitoring information. The action flag area E15A stores a flag to request the execution of an action or a flag to not request the execution of an action. The data/time area E16A stores a date and time when event E1A was generated. The whether-transmitted-to-primary-apparatus-or-not area E17A stores information indicating whether this event E1A has been transmitted to the monitoring manager apparatus 20 which is the primary apparatus. Also, the whether-transmitted-to-secondary-apparatus-or-not area E18A stores information indicating whether this event E1A has been transmitted to the monitoring manager apparatus 20 which is the secondary apparatus.

Therefore, in the case of FIG. 25, it is shown that since the condition definition name is "CPU Monitoring," the relevant event is an event about monitoring information collected from the CPU (CPU activity ratio); the monitoring target apparatus 10 having this CPU is "host α"; and the activity ratio of the collected CPU is at an "Abnormal" level. Moreover, since the collected CPU activity ratio is "95" % and this event has already been transmitted to the monitoring manager apparatus 20 which is the primary apparatus ("whether transmitted to the primary apparatus or not: Y") and has not been transmitted to the monitoring manager apparatus 20 which is the secondary apparatus, it is shown that the monitoring manager apparatus 20 which is the secondary apparatus and receives this event does not request the execution of the action ("action flag: 0"). It is also shown that this event was generated on "2012/11/01 12:00:00."

FIG. 26 shows a conceptual diagram of correspondence relationship information 1035. The correspondence relationship information 1035 is information created, for example, in the memory 103 by the administrator by presetting it in the monitoring target apparatus 10 and stores information indicating a combination of action flags corresponding to a combination of whether the relevant event has been transmitted to the primary apparatus and the secondary apparatus. This correspondence relationship information 1035 is used, when retransmitting event E1A stored in the event retransmission queue 1032A to the monitoring manager apparatus 20 which is the primary apparatus or the secondary apparatus, to rewrite the action flag of event E1A to be retransmitted.

Specifically speaking, the correspondence relationship information 1035 includes a whether-transmitted-to-primary-apparatus-or-not area 10351, a whether-transmitted-to-secondary-apparatus-or-not area 10352, an action-flag-upon-transmission-to-primary-apparatus area 10353, and an action-flag-upon-transmission-to-secondary-apparatus area 10354.

The whether-transmitted-to-primary-apparatus-or-not area 10351 stores Y when event E1A has already been transmitted, or N when event E1A has not been transmitted yet, as information indicating whether event E1A has been transmitted to the monitoring manager apparatus 20 which is the primary apparatus. If N is stored in the whether-transmitted-to-primary-apparatus-or-not area 10351 when retransmitting event E1A, event E1A is retransmitted to the monitoring manager which is the primary apparatus. The whether-event-is-transmitted-to-secondary-apparatus-or-not area 10352 stores Y when event E1A has already been transmitted, or N when event E1A has not been transmitted yet, as information indicating whether event E1A has been transmitted to the monitoring manager apparatus 20 which is the secondary apparatus. If N is stored in the whether-transmitted-to-secondary-apparatus-or-not area 10352 when retransmitting event E1A, event E1A is retransmitted to the monitoring manager which is the secondary apparatus. Furthermore, the action-flag-upon-transmission-to-primary-apparatus area 10353 stores information about the action flag when retransmitting event E1A to the monitoring manager apparatus 20 which is the primary apparatus. The action-flag-upon-transmission-to-secondary-apparatus area 10354 stores information about the action flag when retransmitting event E1A to the monitoring manager apparatus 20 which is the secondary apparatus.

Therefore, in the case of FIG. 26, for example, when event E1A is initially generated, event E1A has not been transmitted to any of the monitoring manager apparatuses 20 which are the primary apparatus and the secondary apparatus (whether transmitted to the primary apparatus or not: N; and whether transmitted to the secondary apparatus or not: N). If event E1A is stored in the event retransmission queue 1032A in this state, it is shown that the action flag of the event E1A is set to 1. Subsequently, if this event E1A is stored in the event retransmission queue 1032A in a state where event E1A has been transmitted to the monitoring manager apparatus 20, which is the primary apparatus, and has not been transmitted to the monitoring manager apparatus 20 which is the secondary apparatus (whether transmitted to the primary apparatus or not: Y; and whether transmitted to the secondary apparatus or not: N), the monitoring manager apparatus 20 which is the secondary apparatus and receives event E1A will not be made to execute the action, so that it is shown that the action flag of the event E1A is set to 0. Furthermore, it is shown that if this event E1A is transmitted to the monitoring manager apparatus 20 which is the secondary apparatus, event E1A is deleted from the event retransmission queue 1032A and will not be stored in the queue.

(2-2) Flowcharts

Figure 27:
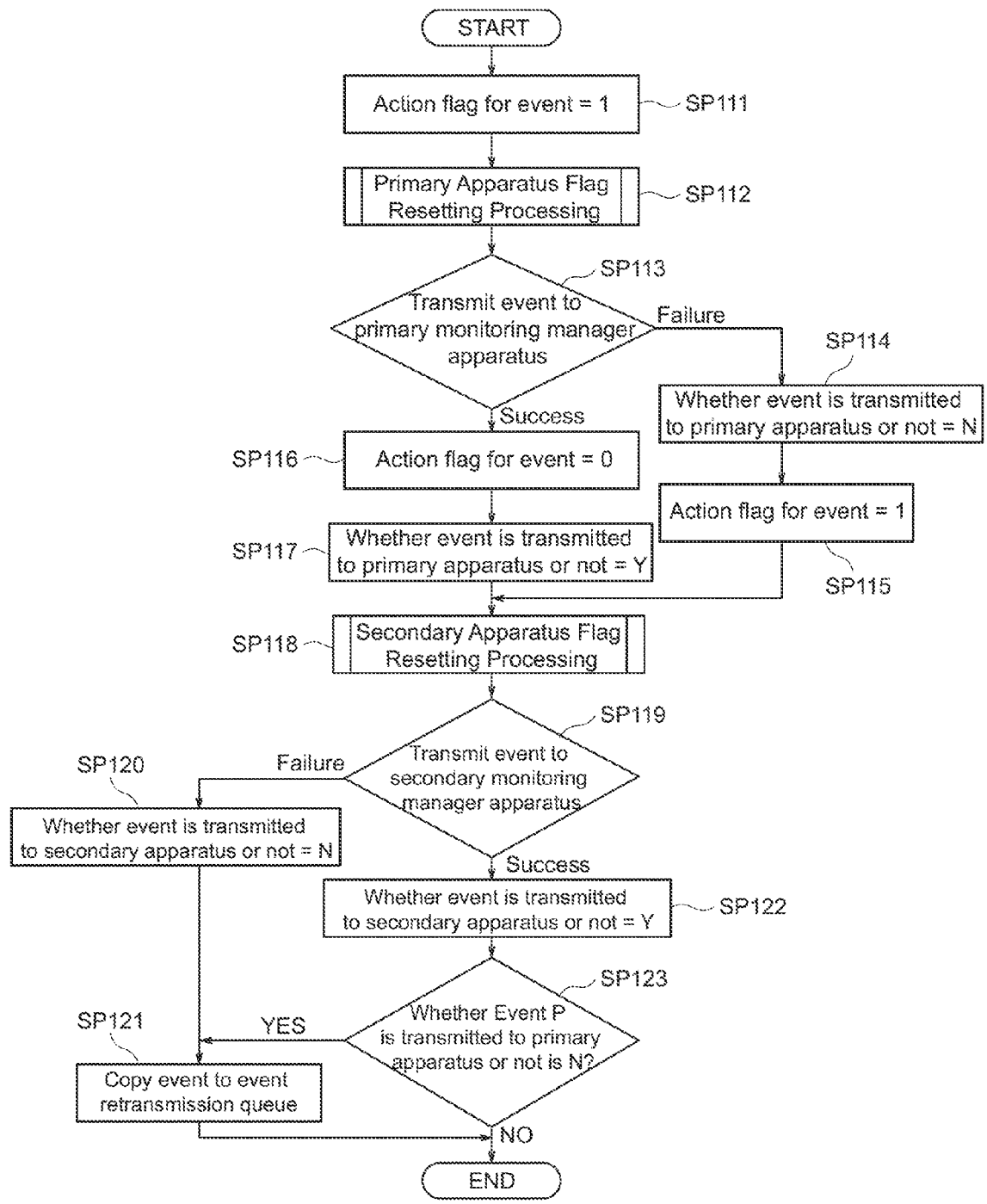
FIG. 27 is a flowchart illustrating the details of the event transmission processing.

FIG. 27 illustrates a detailed processing sequence of event transmission processing according to the second embodiment. This event transmission processing is executed based on the monitoring agent 1034 (the monitoring information storage service program P2) and the CPU 102 as triggered when the processing in the event transmission processing (FIG. 17) proceeds to step SP43.

Firstly, the monitoring agent 1034 sets the action flag of the event to 1 (SP111). Incidentally, the event mentioned here is not an event stored in the event retransmission queues 1032 and 1033, but is an event which is to be transmitted to the monitoring manager apparatus 20 right now.

Next, the monitoring agent 1034 executes primary apparatus flag resetting processing according to the second embodiment (SP112). The details of the primary apparatus flag resetting processing according to the second embodiment will be explained later (FIG. 29); however, briefly speaking, the primary apparatus flag reselling processing is processing executed, when an event(s) waiting to be transmitted, besides the event to be transmitted right now to the monitoring manager apparatus 20 which is set as the primary apparatus, is stored in the event retransmission queue 1032A, to also transmit the event(s), which is stored in this event retransmission queue 1032A and is waiting to be transmitted, at the same time. When this happens, this processing is to set the action flag of all events, which are stored in this event retransmission queue 1032A to be transmitted, to 1 or 0.

After executing the primary apparatus flag resetting processing, the monitoring agent 1034 transmits events, including those whose whether-transmitted-to-primary-apparatus-or-not is N, among the events stored in the event retransmission queue 1032A to the monitoring manager apparatus 20, which is set as the primary apparatus, and then judges whether the transmission has been successful or failed (SP113).

Regarding the event which has failed to be transmitted, the monitoring agent 1034 sets the whether-transmitted-to-primary-apparatus-or-not to N (SP114). Then, since the transmission has failed, the monitoring agent 1034 sets the action flag of this event to 1 (SP115).

On the other hand, regarding the event which has been successfully transmitted, the monitoring agent 1034 sets the action flag of this event to 0 (SP116) and also sets the whether-transmitted-to-primary-apparatus-or-not to Y (SP117).

Next, as preparation for transmission of the event to the monitoring manager apparatus 20 which is the secondary apparatus, the monitoring agent 1034 executes secondary apparatus flag resetting processing according to the second embodiment (SP118). The details of the secondary apparatus flag resetting processing according to the second embodiment will be explained later (FIG. 30); however, briefly speaking, the secondary apparatus flag resetting processing is processing executed, when an event(s) waiting to be transmitted, besides the event to be transmitted right now to the monitoring manager apparatus 20 which is set as the secondary apparatus, is stored in the event retransmission queue 1032A, to also transmit the event(s), which is stored in this event retransmission queue 1032A and is waiting to be transmitted, at the same time. When this happens, this processing is to set the action flag of all events, which are stored in this event retransmission queue 1032A to be transmitted, to 1 or 0.

After executing the secondary apparatus flag resetting processing, the monitoring agent 1034 transmits events, including those whose whether-transmitted-to-secondary-apparatus-or-not is N, among the events stored in the event retransmission queue 1032A, to the monitoring manager apparatus 20, which is set as the secondary apparatus, and then judges whether the transmission has been successful or failed (SP119).

Regarding the event which has failed to be transmitted, the monitoring agent 1034 sets the whether-transmitted-to-secondary-apparatus-or-not to N (SP120) and also stores this event in the event retransmission queue 1032A (SP121) and then terminates this processing.

On the other hand, regarding the event which has been successfully transmitted, the monitoring agent 1034 sets the whether-transmitted-to-secondary-apparatus-or-not to Y (SP122) and also judges whether the whether-transmitted-to-primary-apparatus-or-not is N or not (SP123).

If the monitoring agent 1034 obtains an affirmative result for this judgment, this means that the event has been transmitted to the monitoring manager apparatus 20 which is the secondary apparatus, but not transmitted to the monitoring manager apparatus which is the primary apparatus. So, the monitoring agent 1034 stores this event in the event retransmission queue 1032A (SP121) and terminates this processing.

On the other hand, if the monitoring agent 1034 obtains a negative result for the judgment of step SP123, it determines that the event which was to be transmitted just then has been successfully transmitted to both the monitoring manager apparatuses 20, which are the primary apparatus and the secondary apparatus, and all the events, which were stored in the event retransmission queue 1032A and waiting to be transmitted, have also been transmitted successfully; and then the monitoring agent 1034 terminates this processing.

Figure 28:
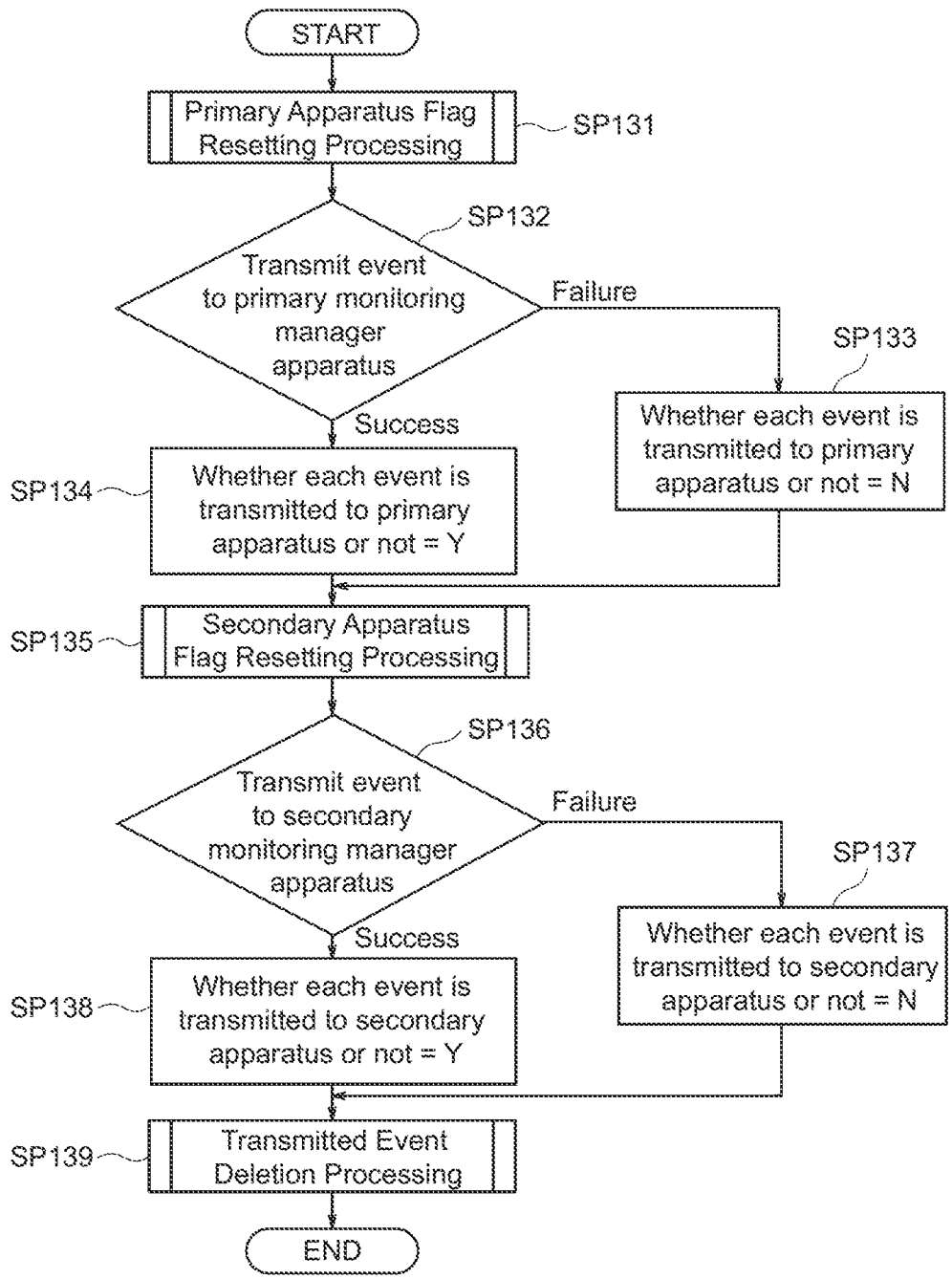
FIG. 28 is a flowchart illustrating the details of the event retransmission processing.

FIG. 28 illustrates a detailed processing sequence of event retransmission processing according to the second embodiment. This event retransmission processing is executed based on the monitoring agent 1034 (the monitoring information storage service program P2) and the CPU 102 as triggered when the processing in the event transmission processing (FIG. 17) proceeds to step SP46.

Figure 29:
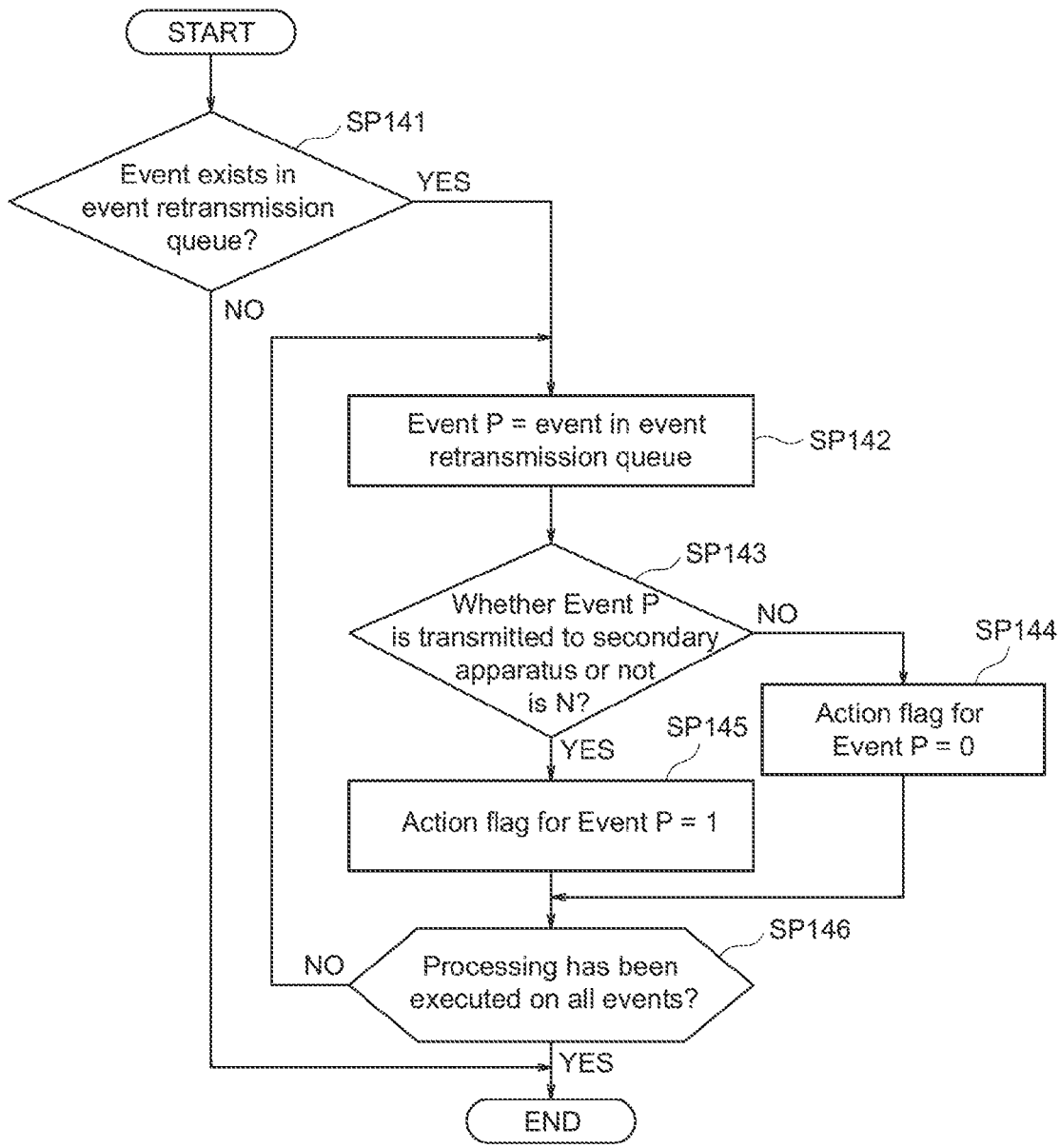
FIG. 29 is a flowchart illustrating primary apparatus flag resetting processing.

Firstly, the monitoring agent 1034 executes the primary apparatus flag reselling processing (SP131). The primary apparatus flag resetting processing is processing as described above for setting the action flag of all the events, which are stored in the event retransmission queue 1032A and waiting to be transmitted, to 1 or 0 and the details of the processing will be explained later (FIG. 29).

Next, after executing the primary apparatus flag resetting processing, the monitoring agent 1034 executes processing for transmitting events, including those whose whether-transmitted-to-primary-apparatus-or-not is N, among the events stored in the event retransmission queue 1032A to the monitoring manager apparatus 20, which is set as the primary apparatus, and then judges whether the transmission has been successful or failed (SP132).

Regarding the event which has been successfully transmitted, the monitoring agent 1034 sets whether-transmitted-to-primary-apparatus-or-not to N (SP133) and proceeds to step SP135.

On the other hand, regarding the event which has been successfully transmitted, the monitoring agent 1034 sets the whether-transmitted-to-primary-apparatus-or-not to Y (SP134) and proceeds to step SP135.

Figure 30:
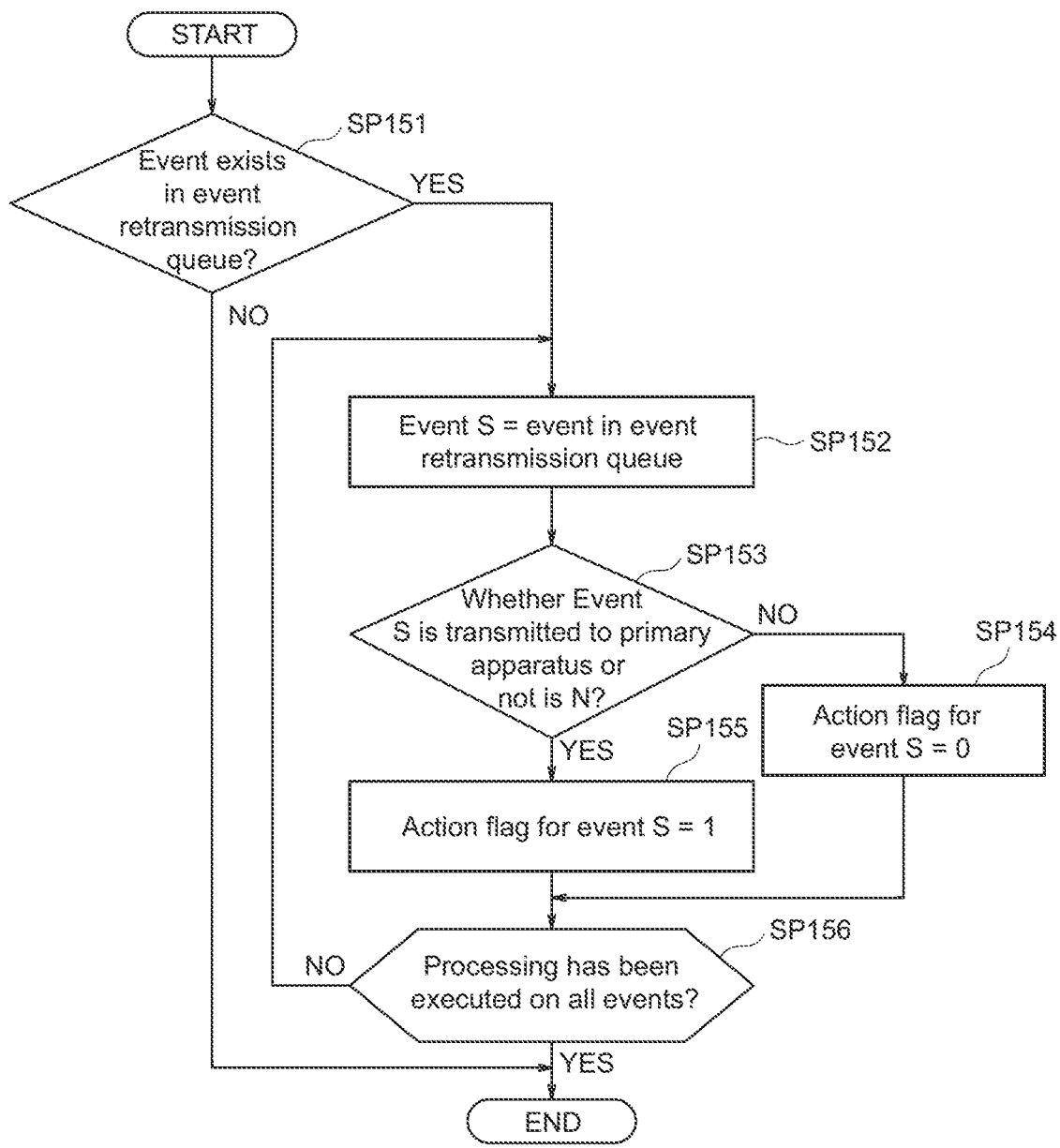
FIG. 30 is a flowchart illustrating secondary apparatus flag resetting processing.

Subsequently, the monitoring agent 1034 executes secondary apparatus flag resetting processing (SP135). The secondary apparatus flag resetting processing is processing as described for setting the action flag of all the events, which are stored in the event retransmission queue 1032A and waiting to be transmitted, to 1 or 0 and the details of the processing will be explained later (FIG. 30).

Then, after executing the secondary apparatus flag resetting processing, the monitoring agent 1034 executes processing for transmitting events, including those whose whether-transmitted-to-primary-apparatus-or-not is N, among the events stored in the event retransmission queue 1032A to the monitoring manager apparatus 20, which is set as the secondary apparatus, and then judges whether the transmission has been successful or failed (SP136).

Regarding the event which has failed to be transmitted, the monitoring agent 1034 sets the whether-transmitted-to-secondary-apparatus-or-not to N (SP137). On the other hand, regarding the event which has been successfully transmitted, the monitoring agent 1034 sets the whether-transmitted-to-secondary-apparatus-or-not to Y (SP138).

Figure 31:
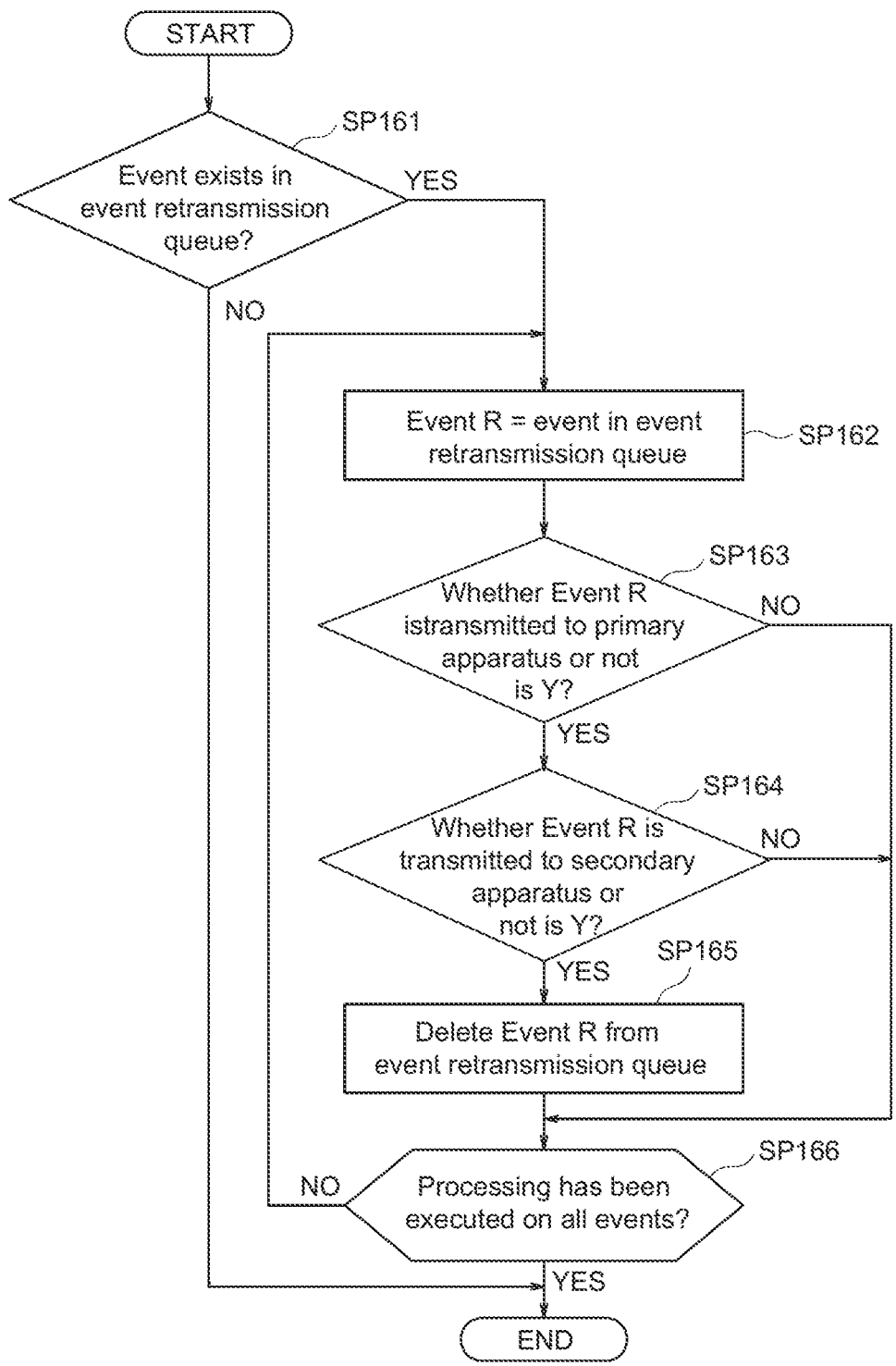
FIG. 31 is a flowchart illustrating transmitted event deletion processing.

Then, the monitoring agent 1034 finally executes transmitted event deletion processing (SP139) and terminates this processing. The transmitted event deletion processing is processing for deleting the event transmitted to both the monitoring manager apparatuses 20, which are the primary apparatus and the secondary apparatus, from the event retransmission queue 1032A and the details of the processing will be explained later (FIG. 31).

FIG. 29 illustrates a processing sequence of the primary apparatus flag reselling processing according to the second embodiment. This primary apparatus flag resetting processing is executed based on the monitoring agent 1034 (the monitoring information storage service program P2) and the CPU 102 as triggered when the event transmission processing (FIG. 18) proceeds to step SP52 or the processing in the event retransmission processing (FIG. 19) proceeds to step SP61.

Firstly, the monitoring agent 1034 judges whether there is any event stored in the event retransmission queue 1032A (SP141). If the monitoring agent 1034 obtains a negative result for this judgment, this means that no event for which the action flag should be reset exists in the queue; and, therefore, the monitoring agent 1034 terminates this processing.

On the other hand, if the monitoring agent 1034 obtains an affirmative result for this judgment, it extracts any one of the events stored in the event retransmission queue 1032A as a processing target and sets this as event P (SP142).

Subsequently, the monitoring agent 1034 judges whether or not the whether-transmitted-to-secondary-apparatus-or-not is set to N, with respect to event P extracted as the processing target (SP143).

If the monitoring agent 1034 obtains a negative result for this judgment, it determines that event P has already been transmitted to the monitoring manager apparatus 20 which is the secondary apparatus. Then, since the action flag of the first transmitted event is set to 1, the action flag of event P transmitted to the monitoring manager apparatus 20 which is the secondary apparatus is set to 1. Therefore, the monitoring agent 1034 sets the action flag of this event P to 0 (SP144).

On the other hand, if the monitoring agent 1034 obtains an affirmative result for the judgment of step SP143, it determines that event P has not been transmitted yet to the monitoring manager apparatus 20 which is set as the secondary apparatus. Therefore, the monitoring agent 1034 sets the action flag of this event P to 1 (SP145).

The monitoring agent 1034 judges whether or not the processing from step SP142 to step SP145 has been executed on all the events stored in the event retransmission queue 1032A (SP146). If the monitoring agent 1034 obtains a negative result for this judgment, it proceeds to step SP142 and repeats the aforementioned processing. On the other hand, if the monitoring agent 1034 obtains a negative result for this judgment, it terminates this processing.

FIG. 30 illustrates a processing sequence of the secondary apparatus flag resetting processing according to the second embodiment. This secondary apparatus flag resetting processing is executed based on the monitoring agent 1034 (the monitoring information storage service program P2) and the CPU 102 as triggered when the processing in the event transmission processing (FIG. 18) proceeds to step SP57 or the processing in the event retransmission processing (FIG. 19) proceeds to step SP64.

Firstly, the monitoring agent 1034 judges whether there is any event stored in the event retransmission queue 1032A (SP151). If the monitoring agent 1034 obtains a negative result for this judgment, this means that that no event for which the action flag should be reset exists in the queue; and, therefore, the monitoring agent 1034 terminates this processing.

On the other hand, if the monitoring agent 1034 obtains an affirmative result for this judgment, it extracts any one of the events stored in the event retransmission queue 1032A as a processing target and sets this as event S (SP152).

Subsequently, the monitoring agent 1034 judges whether or not the whether-transmitted-to-primary-apparatus-or-not is set to N, with respect to event S extracted as the processing target (SP153).

If the monitoring agent 1034 obtains a negative result for this judgment, it determines that event S has already been transmitted to the monitoring manager apparatus 20 which is the primary apparatus. Then, since the action flag of the first transmitted event is set to 1, the action flag of event S transmitted to the monitoring manager apparatus 20 which is the primary apparatus is set to 1. Therefore, the monitoring agent 1034 sets the action flag of this event S to 0 (SP154).

On the other hand, if the monitoring agent 1034 obtains an affirmative result for this judgment, it determines that event S has not been transmitted yet to the monitoring manager apparatus 20 which is set as the primary apparatus. Therefore, the monitoring agent 1034 sets the action flag of this event S to 1 (SP155).

The monitoring agent 1034 judges whether or not the processing from step SP152 to step SP155 has been executed on all the events stored in the event retransmission queue 1032A (SP156). If the monitoring agent 1034 obtains a negative result for this judgment, it proceeds to step SP152 and repeats the aforementioned processing. On the other hand, if the monitoring agent 1034 obtains a negative result for this judgment, it terminates this processing.

FIG. 31 illustrates a processing sequence of the transmitted event deletion processing. This transmitted event deletion processing is executed based on the monitoring agent 1034 (the monitoring information storage service program P2) and the CPU 102 as triggered when the processing in the event retransmission processing (FIG. 28) according to the second embodiment proceeds to step SP139.

Firstly, the monitoring agent 1034 judges whether or not there is any event stored in the event retransmission queue 1032A (SP161). If the monitoring agent 1034 obtains a negative result for this judgment, this means that that no event to be deleted exists in the queue; and, therefore, the monitoring agent 1034 terminates this processing.

On the other hand, if the monitoring agent 1034 obtains an affirmative result for this judgment, it extracts any one of the events stored in the event retransmission queue 1032A as a processing target and sets this as event R (SP162).

Subsequently, the monitoring agent 1034 judges whether or not the whether-transmitted-to-primary-apparatus-or-not is set to Y, with respect to event R extracted as the processing target (SP163).

If the monitoring agent 1034 obtains a negative result for this judgment, it proceeds to step SP166. On the other hand, if the monitoring agent 1034 obtains an affirmative result for this judgment, it judges whether or not the whether-transmitted-to-secondary-apparatus-or-not is set to Y, with respect to event R extracted as the processing target (SP164).

If the monitoring agent 1034 obtains a negative result for this judgment, it proceeds to step SP166. On the other hand, if the monitoring agent 1034 obtains an affirmative result for this judgment, it deletes event R, which was extracted as the processing target, from the event retransmission queue 1032A (SP165).

The monitoring agent 1034 judges whether or not the processing from step SP162 to step SP165 has been executed on all the events stored in the event retransmission queue 1032A (SP166). If the monitoring agent 1034 obtains a negative result for this judgment, it proceeds to step SP162 and repeats the aforementioned processing. On the other hand, if the monitoring agent 1034 obtains an affirmative result for this judgment, it terminates this processing.

(2-3) Advantageous Effects of this Embodiment

The monitoring system 1 according to this embodiment is designed as described above so that the whether-transmitted-to-primary-apparatus-or-not information and the whether-transmitted-to-secondary-apparatus-or-not information are stored in an event and the action flag of the event to be stored in the queue is set based on the combination of these pieces of whether-transmitted-or-not information. So, the same advantageous effects as those of the first embodiment can be obtained by retaining one common event retransmission queue 1032A without retaining two queues for the primary apparatus and the secondary apparatus in the memory 103.

(3) Other Embodiments

In this embodiment, one of the monitoring manager apparatuses 20 having the double active configuration is set as the primary apparatus and the other one is set as the secondary apparatus; however, the invention is not limited to this example and, for example, the invention may be configured so that even the monitoring manager apparatus 20 which is set as the primary apparatus for one administrator may be used as the monitoring manager apparatus 20 which is set as the secondary apparatus for another administrator.

Specifically speaking, the primary apparatus and the secondary apparatus in the connection destination monitoring manager management table 1021 are set for each monitoring target apparatus 10. For example, with a first monitoring target apparatus 10 among a plurality of monitoring target apparatuses 10, the monitoring manager apparatus 20 "host α" is set as the primary apparatus and the monitoring manager apparatus 20 "host β" is set as the secondary apparatus. Meanwhile, with a second monitoring target apparatus 10, "host α" is set as the secondary apparatus and "host β" is set as the primary apparatus. By setting the primary apparatus and the secondary apparatus individually for each monitoring target apparatus 10 in this way, it is possible to set the monitoring manager apparatus 20 "host α" as the primary apparatus for the first monitoring target apparatus 10 and set the monitoring manager apparatus 20 "host β" as the primary apparatus for the second monitoring target apparatus 10. As a result, it is possible to set the monitoring manager apparatus 20 (the primary apparatus) intended to primarily execute an action for each administrator. It is also possible to set information that can be viewed by each administrator.

REFERENCE SIGNS LIST

1 monitoring system
10 monitoring target apparatus
1034 monitoring agent
20 monitoring manager apparatus
P3 monitoring manager
30 monitoring console

The invention claimed is:

1. A monitoring target apparatus connected to a plurality of monitoring manager apparatuses, the monitoring target apparatus comprising:
   a plurality of types of monitoring target resources; and
   a monitoring agent configured to collect monitoring information from the monitoring target resources and monitoring condition management information that defines an event issuance condition for each of the plurality of types of monitoring target resources,
   wherein the monitoring agent judges whether or not to issue an event based on the monitoring information and the monitoring condition management information,
   if the monitoring agent issues the event, the monitoring agent transmits the issued event to all the plurality of monitoring manager apparatuses, and
   when the monitoring agent receives the event, the monitoring agent transmits an action execution request to one monitoring manager apparatus of the plurality of monitoring manager apparatuses to request execution of a predetermined action at the monitoring manager apparatus.

2. A monitoring target apparatus according to claim 1, wherein if the transmission of the action execution request to the one monitoring manager apparatus is successful, the monitoring agent transmits an action stop request to another monitoring manager apparatus, which is different from the one monitoring manager apparatus, to request no execution of the action at the monitoring manager apparatus even when the monitoring agent receives the event.

3. A monitoring target apparatus according to claim 2, wherein the event is configured by including the action execution request or the action stop request; and
   wherein the monitoring agent requests the one monitoring manager apparatus to execute an action by sending the event to the one monitoring manager apparatus; and
   the monitoring agent requests the other monitoring manager apparatus to stop the action by sending the event to the other monitoring manager apparatus.

4. A monitoring target apparatus according to claim 3, wherein the monitoring target apparatus is configured by including, in a memory, connection destination monitoring manager management information for managing each of the plurality of monitoring manager apparatuses and priority by associating them with each other; and
   wherein when the monitoring agent issues the event, the monitoring agent refers to the connection destination monitoring manager management information and transmits an event including the action execution request to a high-priority monitoring manager apparatus; and when the transmission has been successful, the monitoring agent transmits an event including the action stop request to a low-priority monitoring manager apparatus.

5. A monitoring target apparatus according to claim 4, wherein when the transmission of the event to the monitoring manager apparatus has failed, the monitoring target apparatus is configured by including, in the memory, an event retransmission queue for storing the event which has failed to be transmitted;
  wherein when the monitoring agent is to retransmit an event stored in the event retransmission queue to the high-priority monitoring manager apparatus, the monitoring agent includes either the action execution request or the action stop request in all events stored in the event retransmission queue and retransmits the event to the high-priority monitoring manager apparatus; and
  wherein when the monitoring agent is to retransmit an event stored in the event retransmission queue to the low-priority monitoring manager apparatus, the monitoring agent includes either the action execution request or the action stop request in all events stored in the event retransmission queue and transmits the event to the low-priority monitoring manager apparatus.

6. A monitoring target apparatus according to claim 5, wherein the event retransmission queue includes a primary apparatus event retransmission queue to be retransmitted to the high-priority monitoring manager apparatus and a secondary apparatus event retransmission queue to be retransmitted to the low-priority monitoring manager apparatus;
  wherein when the monitoring agent is to retransmit an event stored in the primary apparatus event retransmission queue to the high-priority monitoring manager apparatus, the monitoring agent includes, with respect to all events stored in the primary apparatus event retransmission queue, the action execution request in an event, which is also stored in the secondary apparatus event retransmission queue, or includes the action stop request in an event, which is not stored in the secondary apparatus event retransmission queue, and then retransmits the event stored in the primary apparatus event retransmission queue to the high-priority monitoring manager apparatus; and
  wherein when the monitoring agent is to retransmit an event stored in the secondary apparatus event retransmission queue to the low-priority monitoring manager apparatus, the monitoring agent includes, with respect to all events stored in the secondary apparatus event retransmission queue, the action execution request in an event, which is also stored in the primary apparatus event retransmission queue, or includes the action stop request in an event, which is not stored in the primary apparatus event retransmission queue, and then retransmits the event stored in the secondary apparatus event retransmission queue to the low-priority monitoring manager apparatus.

7. A monitoring target apparatus according to claim 5, wherein the event retransmission queue is one queue commonly used to be retransmitted to both the high-priority monitoring manager apparatus and the low-priority monitoring manager apparatus;
  wherein the event includes whether-transmitted-to-primary-apparatus-or-not information indicating whether the event has been transmitted to the high-priority monitoring manager apparatus or not, and whether-transmitted-to-secondary-apparatus-or-not information indicating whether the event has been transmitted to the low-priority monitoring manager apparatus;
  wherein when the monitoring agent is to retransmit an event stored in the event retransmission queue to the high-priority monitoring manager apparatus, the monitoring agent includes, with respect to all events stored in the event retransmission queue, the action execution request in an event, which has not been transmitted yet to the low-priority monitoring manager apparatus, or includes the action stop request in an event, which has been transmitted to the low-priority monitoring manager apparatus, and then retransmits the event stored in the event retransmission queue to the high-priority monitoring manager apparatus; and
  wherein when the monitoring agent is to retransmit an event stored in the event retransmission queue to the low-priority monitoring manager apparatus, the monitoring agent includes, with respect to all events stored in the event retransmission queue, the action execution request in an event, which has not been transmitted yet to the high-priority monitoring manager apparatus, or includes the action stop request in an event, which has been transmitted to the high-priority monitoring manager apparatus, and then retransmits the event stored in the event retransmission queue to the low-priority monitoring manager apparatus.

8. A tangible, non-transitory computer readable medium having instructions for causing a computer for a monitoring target apparatus, connected to a plurality of monitoring manager apparatuses to execute a method comprising:
  collecting, by a monitoring agent of a monitoring target apparatus having a plurality of types of monitoring target resources and connected to a plurality of monitoring manager apparatuses, monitoring information from the monitoring target resources and monitoring condition management information that defines an event issuance condition for each of the plurality of types of monitoring target resources; and
  judging by the monitoring agent, whether or not to issue an event based on the monitoring information and the monitoring condition management information;
  transmitting the issued event to the plurality of monitoring manager apparatuses if the monitoring agent issues the event, wherein the monitoring agent transmits an action execution request, upon receipt of the event, to one monitoring manager apparatus of the plurality of monitoring manager apparatuses to request execution of a predetermined action at the monitoring manager apparatus.

9. A tangible, non-transitory computer readable medium according to claim 8, wherein if the transmission of the action execution request to the one monitoring manager apparatus is successful, the method further comprising transmitting an action stop request to another monitoring manager apparatus, which is different from the one monitoring manager apparatus, to request no execution of the action at the monitoring manager apparatus even when the monitoring agent has received the event.

10. A monitoring system comprising:
  a monitoring target apparatus comprising:
    a plurality of types of monitoring target resources; and
    a monitoring agent configured to collect monitoring information from the plurality of types of monitoring target resources and monitoring condition management information that defines an event issuance condition for each of the plurality of types of monitoring target resource, and
  a plurality of monitoring manager apparatuses connected to the monitoring target apparatus, wherein the monitoring agent judges whether or not to issue an event based on the monitoring information and the monitoring condition management information, if the monitoring agent issues the event, the monitoring agent transmits the issued event to all the plurality of monitoring manager apparatuses, each of the monitoring manager apparatuses receives the event from the monitoring agent, when the monitoring agent receives the event, the monitoring agent transmits an action execution request to any one monitoring manager apparatus of the plurality of monitoring manager apparatuses to request execution of a predetermined action at the monitoring manager apparatus, and each of the monitoring manager apparatuses executes the action based on the action execution request from the agent.

11. A monitoring system according to claim 10, wherein if the transmission of the action execution request to the one monitoring manager apparatus is successful, the monitoring agent transmits an action stop request to another monitoring manager apparatus, which is different from the one monitoring manager apparatus, to request no execution of the action at the monitoring manager apparatus even when the monitoring agent has received the event; and each of the monitoring manager apparatuses controls the action to not execute based on the action stop request from the agent even when the monitoring agent receives the event.

* * * * *